United States Patent
Agrawal

(10) Patent No.: US 6,550,274 B1
(45) Date of Patent: Apr. 22, 2003

(54) BATCH DISTILLATION

(75) Inventor: Rakesh Agrawal, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 18 days.

(21) Appl. No.: 10/006,854

(22) Filed: Dec. 5, 2001

(51) Int. Cl.$^7$ .................................................. F25J 3/02
(52) U.S. Cl. .................................................... 62/617
(58) Field of Search .......................... 62/617, 620, 901, 62/905

(56) References Cited

U.S. PATENT DOCUMENTS

| | | | |
|---|---|---|---|
| 2,471,134 | A | 5/1949 | Wright |
| 3,844,898 | A | 10/1974 | De Graff |
| 3,959,085 | A | 5/1976 | De Graff |
| 5,970,742 | A | 10/1999 | Agrawal et al. |
| 6,106,674 | A | 8/2000 | Agrawal et al. |
| 6,240,744 | B1 | 6/2001 | Agrawal |
| 6,250,106 | B1 | 6/2001 | Agrawal |

OTHER PUBLICATIONS

Bridge the Gap with Semicontinuous Distillation. www.cepmagazine.org, Aug. 2001.
*Conceptual Desing of Distillation Systems*, M.F. Doherty and M.F. Malone. vol. 17, No. 2. Chapter 9. pp417–420. (2001).
"Multicomponent Distillation Columns with Partitions and Multiple Reboilers and Condensers", R. Agrawal. Ind. Eng. Chem. Res. (2001), 40, pp. 4258–4266.
*Reviews in Chemical Engineering* vol. 17, No. 2. pp. 111–164 (2001).
"More Operable Fully thermally Coupled Distillation Column Configurations For Multicomponent Distillation", R. Agrawal. Trans IchemE, Vo.. 77, Part A, Sep. (1999) pp 543–553.
"Comparative Engery Consumption in Batch and Continuous Distillation," Computers Chem. Engng. vol. 21, Suppl. pp S529–S534 (1997).
"Running Batch Distillation in a Column with a Middle Vessel", Ind. Eng. Chem. Res. pp. 4612–4618 (1996).
"Simultaneous Separation of Light and Heavy Impurities by a Complex Batch Distillation Column" Journal of Chemcial Engineering of Japan, vol. 29 No. 6 pp. 1000–1006 (1996).

*Primary Examiner*—William C. Doerrler
*Assistant Examiner*—Malik N. Drake
(74) *Attorney, Agent, or Firm*—Willard Jones II

(57) ABSTRACT

An improved process and apparatus used to perform the process for batch distillation of a multi-component mixture containing three or more components is provided. The process and apparatus uses at least three distillation zones. For a time period during distillation operation, the component of intermediate volatility is collected along with the collection of either the volatile component and/or the heavy component.

42 Claims, 12 Drawing Sheets

Batch Distillation with a Side Stripper

Prior Art

Conventional Batch Distillation

Batch Distillation with a Side Stripper

Divided Wall Side Stripper Batch Distillation

Concentric Cylinder Side Stripper Batch Distillation

Batch Distillation with a Side Rectifier

Divided Wall Side Rectifier Batch Distillation

Middle Vessel Fully-Coupled Batch Distillation

Divided Wall Fully-Coupled Batch Distillation with an Intermediate Product Tank

Divided Wall Fully-Coupled Batch Distillation

Middle Vessel Divided Wall Side Stripper Batch Distillation

**Middle Vessel Divided Wall Side Rectifier
Batch Distillation

Extractive Distillation Using Middle Vessel Divided Wall Side Rectifier Batch Distillation

BATCH DISTILLATION

BACKGROUND OF THE INVENTION

The present invention relates generally to batch distillation, and in particular to batch distillation processes and apparati to separate multi-component mixtures containing three or more components.

New, high-value specialty chemicals and pharmaceutical drugs are continually introduced in the market. Generally, these chemicals are separated through batch distillation. Batch distillation, as against continuous distillation, is used because it provides operational flexibility. It is not uncommon to use the same batch distillation equipment for a large number of products. In batch distillation, one distillation column is used to separate a multi-component mixture into several product streams. On the other hand, a continuous distillation system uses a number of distillation columns. The operating flexibility and equipment cost make a batch distillation column quite attractive for numerous distillation applications. It is well known, however, that batch distillation requires much more heat duty than continuous distillation (comparative energy consumption in batch and continuous distillation, O. Oppenheimer and E. SØrensen, Computers Chem. Engng, Vol 21, Suppl., pp S529–S534, 1997). An objective of the present invention is to reduce the energy consumption of batch distillation, reduce the time taken to distill a batch, and provide more choices for operating modes.

For the distillation of a multi-component mixture, both continuous and batch distillations are used. Generally when large quantities are to be distilled, continuous feed distillation is used, otherwise batch distillation is preferred.

The details of continuous multi-component feed distillation column arrangements can be found in U.S. Pat. Nos. 5,970,742 and 6,106,674, both assigned to Air Products and Chemicals, Inc. Consider the separation of a ternary mixture ABC having components A, B and C into three product streams each enriched in one of the components. A is the volatile component, C is the heavy component and B is of intermediate volatility. The continuous feed distillation schemes use two distillation columns. U.S. Pat. No. 5,970,742 discusses five well-known schemes: direct sequence, indirect sequence, side rectifier, side stripper and thermally coupled columns. These are described in FIGS. 1 through 5 of the '742 Patent. This patent also describes some new continuous feed distillation schemes for multi-component feed distillation. In the direct and indirect sequences, feed is continually fed to a distillation column, a product stream is produced from one end of this column and a mixture from the other end is sent to the other column for further distillation. Each distillation column has a reboiler and a condenser. In thermally coupled column systems, fewer reboilers and condensers are used. This is achieved by having a two-way communication between the two distillation columns. In a two-way communication mode, when a vapor stream is sent from one column to another column, a return liquid stream is implemented between the two distillation columns. The side rectifier, side stripper and thermally coupled columns use thermal coupling to not only reduce the total number of reboilers and condensers in a continuous multi-component feed distillation but also to reduce the total heat demand for distillation.

Recently, cost reduction for continuous multi-component feed distillation columns with thermal coupling was suggested by building two or more distillation column's functions in a single shell column. Some of these configurations are also known as divided wall columns. U.S. Pat. No. 2,471,134 was the first to describe a fully coupled divided wall column arrangement. U.S. Pat. Nos. 3,844,898 and 3,959,085 describe concentric cylinders in lieu of side stripper type configurations to distill a continually fed multi-component feed stream. Some recent examples of divided wall or partitioned distillation columns are given in two U.S. Patents assigned to Air Products and Chemicals, Inc.; namely U.S. Pat. Nos. 6,240,744 and 6,250,106. Two recent publications describe continuous multi-component feed distillation columns with partitions and multiple reboilers and condensers in detail ("More Operable Fully Thermally Coupled Distillation Column Configurations for Multi-component Distillation" R. Agrawal, Trans. IChemE, Vol 77, Part A, pp 543–553, 1999; and "Multi-component Distillation Columns with Partitions and Multiple Reboilers and Condensers", R. Agrawal, Ind. Eng. Chem. Res., Vol. 40, pp. 4258–4266, 2001).

Besides the continuous feed distillations, batch distillations are also used to separate multi-component mixtures. A recent review article provides a good survey of the state of the art ("New Era in Batch Distillation: Computer Aided Analysis, Optimal Design and Control", K. J. Kim and U. M. Diwekar, Reviews in Chemical Engineering, Vol 17, pp 111–164, 2001). A conventional batch distillation column 110 is shown in FIG. 1. It consists of a reboiler 130 at the bottom and a condenser 160 at the top. The distillation column 110 includes devices that promote vapor-liquid contact for mass transfer and provide separation stages. Structured packing, dumped packing and several types of trays are used for this purpose. In a typical process, the multi-component mixture is charged either in the bottom sump of the column 110 or in the reboiler 130. Then heat is added to the reboiler and vapor ascends the column. The vapor is condensed in the condenser 160 through heat removal and collects in the reflux drum 162. Initially the condensed liquid is sent through line 166 to the distillation column and no product is collected from line 170. This operation is continued until the liquid holdup in both the column and in the reflux drum is met. After that the apparatus is run at total reflux until the acceptable purity of the volatile component A is achieved in the reflux drum. At that point, volatile product is withdrawn through line 170 according to a prescribed mode. The three modes often used are (i) constant reflux ratio, (ii) variable reflux ratio, and (iii) optimal reflux ratio. Reflux ratio is defined as the ratio of liquid flow rate in line 166 to the product flow rate in line 170. In variable reflux ratio mode, the reflux ratio is varied to keep the product composition constant. In optimal reflux ratio mode, reflux ratio is constantly changed to meet an objective function; e.g., to minimize the batch time for distillation. Generally, in constant reflux ratio and optimal reflux ratio modes, the composition of product in line 170 varies with time. When the product is collected in a storage vessel, however, the average composition meets the required specification. After the volatile component has been collected, a slop cut containing other components is collected through line 170. This is done until the desired purity of the intermediate volatility component is achieved. Then this product is collected through line 170 according to a prescribed mode. The slop cut is generally recycled to the distillation system in the next batch. The distillation is continued until all the desired product streams have been collected from the top reflux drum. In the end, the heavy component is recovered from the sump or the reboiler through line 140. When the batch distillation is run in this mode, the distillation column arrangement is known as "traditional batch column," "conventional batch distillation," "ordinary column," or "batch rectifier."

In recent times, other batch distillation configurations have been suggested. These are also discussed in Chapter 9, pages 417–420, of the textbook by Doherty and Malone (Conceptual Design of Distillation Systems, M. F. Doherty and M. F. Malone, McGraw Hill, 2001). In a batch stripper case, most of the multi-component mixture is initially charged at the top of the column, such as in the reflux drum 162. The column is started by having some of the multi-component mixture charged to the bottom reboiler 130 and heat is provided to start the batch operation. No product is initially withdrawn. The column is operated until the desired purity of the heavy component is achieved in the column bottom sump. Then the heavy component is withdrawn in line 140 according to a prescribed mode of operation: constant reboil ratio, variable reboil ratio and optimal reboil ratio. The ratio of vapor flow rate in line 132 to the product flow rate in line 140 is called reboil ratio. The rest of the operating procedure is similar to batch rectifier with the difference that product streams of successively higher volatilities are collected from line 140.

Another novel batch distillation configuration uses a middle vessel column. In this arrangement, a multi-component mixture is initially charged to a middle vessel. Liquid from this middle vessel is fed to an intermediate location of the distillation column. The liquid from the tray above this feed location is withdrawn from the column and sent to the middle vessel. As a result, during a batch campaign, the middle vessel never gets empty. As the distillation progresses, the volatile component is withdrawn from the top of the distillation column, and the heavy component from the bottom of the column and the component of intermediate volatility accumulate in the middle vessel. Several operating strategies for the middle vessel column can be found in Hasebe, et. al. ("Simultaneous Separation of Light and Heavy Impurities by a Complex Batch Distillation Column", Journal of Chemical Engineering of Japan, Vol. 29, pp. 1000–1006, 1996) and the earlier mentioned review article by Kim and Diwekar. A pilot plant study of the middle vessel column using binary mixture is given by Barolo, et. al. ("Running Batch Distillation in a Column With a Middle Vessel", Ind. Eng. Chem. Res., Vol. 35, pp. 4612–4618, 1996).

Recently, Phimister and Seider have described a semi-continuous distillation using a middle vessel column arrangement ("Bridge the Gap With Semicontinuous Distillation", Chemical Engineering Progress, pp. 72–78, August 2001). In this arrangement, the multi-component mixture is initially charged to the middle vessel, and the distillate from the top of the column, concentrated in volatile component, is removed continuously, although in diminishing amounts. The column bottoms, consisting of heavy component, is also removed continuously in diminishing quantities. During this time interval, the middle vessel becomes concentrated in the intermediate volatility component. At this point, the middle vessel is nearly emptied and is then charged with the multi-component mixture. The whole process is then repeated.

The use of middle vessel column for batch extractive distillation is also suggested (for e.g., see earlier referenced book of Doherty and Malone and also the paper by Phimister and Seider). In this case, a heavy extractive solvent is added near the top of the column, above the feed point from the middle vessel, to break an azeotrope. The extractive solvent collects in the sump/reboiler of the column and is recycled. Phimister and Seider provide an example to distill an acetone/methanol mixture with water as an extractive solvent.

It is clear from the discussion that interest in batch distillation is currently on a rise. The reason for this is that a batch distillation is flexible; it can handle low throughput and requires low investment. This makes it quite attractive for fine/specialty and pharmaceutical chemicals.

A continuous feed distillation process runs at a steady state with a multi-component feed being fed at a constant rate to the distillation column system. Once the columns achieve steady state, there are no transients and the concentration profiles along the height of a distillation column do not change with time. The design of this column system is often optimized to perform one separation. As against the continuous feed distillation, in a batch distillation the multi-component mixture is not continuously charged at a fixed rate to the distillation column. It is generally charged at the start of a batch campaign. Sometimes it is charged at certain intervals of time. During a campaign, the column is always in transition; i.e., the concentration profiles along the height of the distillation column change with time. Quite often the holdups in certain locations also change. This is also true for so-called semi continuous distillation. Phimister and Seider's paper clearly shows the variation with time in holdups and concentrations at several locations of a semi-continuous distillation column.

BRIEF SUMMARY OF THE INVENTION

The present invention is a process for the separation of a multi-component mixture containing at least three major constituent components of different relative volatilities into product streams that are enriched in one of the major constituent components by batch distillation in a distillation column system. Therefore, one aspect of the present invention is an apparatus for (a) charging the multi-component mixture containing at least three major components to a distillation column system having at least three distillation zones, wherein one of the distillation zones is in fluid communication with the vapor and liquid flows of the at least two other distillation zones; (b) distilling the multi-component mixture within the at least three distillation zones such that distillation is conducted for at least a period of time without any addition of the multi-component mixture to the distillation column system; (c) collecting a light product stream enriched in the light component from the top of one distillation zone; (d) collecting a heavy product stream enriched in the heavy component from the bottom of a different distillation zone from step (c); and (e) collecting an intermediate volatility stream enriched in the medium component from a third distillation zone which is different from the distillation zones of steps (c) and (d).

According to one preferred embodiment of the present invention, the process comprises the steps of charging a multi-component mixture containing at least three major components to a distillation column; distilling the multi-component mixture within at least two distillation zones within the distillation column; providing a first portion of the distilled stream from the location where the two distillation zones meet, to a third distillation zone; collecting a light product stream enriched in the light component from the top of the distillation column; collecting an intermediate volatility stream enriched in the medium component from the third distillation zone; and collecting a heavy product stream enriched in the heavy component from the bottom of the distillation column.

Another aspect of the present invention includes a process comprising charging the multi-component mixture containing three or more major constituent components to a first distillation column; establishing a two-way communication between an intermediate section of the first distillation column and a first location of a second distillation column by feeding at least a portion of the vapor or liquid stream exiting from the intermediate section of the first distillation column to the first location of the second distillation column and in return withdrawing a stream of the opposite phase from the first location of the second distillation column and feeding it to the intermediate section of the first distillation column; and removing a first stream from the second distillation column, recycling a first part of the first stream back to the first distillation column and removing a second part of the first stream as a product stream from the distillation column system.

Still another aspect of the present invention includes a batch distillation column system for distillation of a multi-component mixture containing at least three major constituent components of different relative volatilities into product streams that are enriched in one of the major constituent components. The system comprises a first distillation column having a top and a bottom and at least two distillation zones disposed therein; a second distillation column having a top and bottom, the top of the second distillation column in two-way communication with the first distillation column at a point between the two distillation zones of the first distillation column; a reflux drum which receives condensed vapor from the top of the first distillation column; a first reboiler in communication with the bottom of the first distillation column; and a second reboiler in communication with the bottom of the second distillation column.

Still yet another embodiment includes process for the separation of a multi-component mixture containing at least three major constituent components of different relative volatilities into product streams that are enriched in one of the major constituent components by distillation in a distillation column system containing at least two distillation columns. This process comprises charging the multi-component mixture containing three or more major constituent components to a first distillation column; causing distillation to occur within the first distillation column until a majority of the heaviest component is below an intermediate section of the first distillation column; establishing two-way communication between the intermediate section of the first distillation column and the top of a second distillation column by feeding at least a portion of the liquid stream exiting from the intermediate section of the first distillation column to the top of the second distillation column and in return withdrawing a stream of vapor from the top of the second distillation column and passing the withdrawn stream back to the intermediate section of the first distillation column; condensing a vapor stream from the top of the first distillation column and collecting the resultant liquid in a reflux drum; returning at least part of the liquid collected in the reflux drum in the previous step to the top of the first distillation column; removing a first product stream from the reflux drum after an acceptable concentration of the most volatile component is reached in the reflux drum; removing a second product stream from the bottom of the second distillation column after an acceptable concentration of the intermediate volatile component is reached; and removing a third product stream from the bottom of the first distillation column after an acceptable concentration of the heaviest volatile component is reached.

Still yet another embodiment includes a batch distillation column system for distillation of a multi-component mixture containing at least three major constituent components of different relative volatilities into product streams that are enriched in one of the major constituent components comprising a distillation column having a top and a bottom and at least three distillation zones disposed therein, the distillation column having an upper and lower region, the lower region having a vertical separating element which defines the first and third distillation zones, the upper region defining the second distillation zone; a reflux drum at the top of the distillation column; a first reboiler at the bottom of the first distillation zone; and a second reboiler at the bottom of the third distillation zone.

An additional system embodiment in accordance with the present invention includes a batch distillation column system for distillation of a multi-component mixture containing at least three major constituent components of different relative volatilities into product streams that are enriched in one of the major constituent components comprising a first distillation column having a top and a bottom and at least two distillation zones disposed therein; a second distillation column having a top and bottom, the bottom of the second distillation column in two-way communication with the first distillation column at a point between the two distillation zones of the first distillation column; a reflux drum in fluid communication with the first distillation column; a first reboiler in fluid communication with the first distillation column; and a second reflux drum in fluid communication with the second distillation column.

Still another embodiment includes a process for the separation of a multi-component mixture containing at least three major constituent components of different relative volatilities into product streams that are enriched in one of the major constituent components by distillation in a distillation column system containing at least two distillation columns comprising charging at least a portion of the multi-component mixture containing three or more major constituent components to the first reflux drum located at the top of the first distillation column; causing distillation to occur within the first distillation column until a majority of the light component is above an intermediate section of the first distillation column; establishing a two-way communication between an intermediate section of the first distillation column and the bottom of a second distillation column by feeding at least a portion of the vapor stream exiting from the intermediate section of the first distillation column to the bottom of the second distillation column and in return withdrawing a stream of liquid from the bottom of the second distillation column and passing the withdrawn stream back to the intermediate section of the first distillation column; condensing a vapor stream from the top of the second distillation column and collecting the resultant liquid in a second reflux drum; returning at least portion of the liquid collected in the second reflux drum to the top of the second distillation column; removing a first product stream from the second reflux drum after an acceptable concentration of the intermediate volatile component is reached in the second reflux drum; removing a second product stream from the bottom of the first distillation column after an acceptable concentration of the heaviest volatile component is reached; and removing a third product stream from the first reflux drum at the top of the first distillation column after an acceptable concentration of the lightest volatile component is reached.

Still yet additional embodiments consistent with the present invention are included and are discussed in more detail below.

DETAILED DESCRIPTION OF THE INVENTION

The current invention relates to improvements in a batch distillation apparatus for the distillation of a multi-component mixture. It also relates to some of the operating procedures to exploit the improvements in the batch distillation apparatus. The described operating procedures are not all-inclusive, and are suggested only as examples. The multi-component mixture stream separated by the present invention contains three or more components and is separated into at least three product streams. The apparatus and methods are also applicable to semicontinuous distillation. The essential features of the invention can be described as follows:

The present invention includes a batch distillation process for the distillation of a multi-component mixture containing at least three components, each component having a different volatility, into at least three streams. The invention includes a process and apparatus which comprises:

a. initially charging the multi-component mixture to at least one suitable location in a distillation column system, wherein the distillation column system comprises three or more distillation zones such that one end of one of the distillation zones is in communication through both vapor and liquid flows with at least two of the other distillation zones;

b. providing, for each distillation zone, the needed vapor/liquid at the ends through a heat addition device/heat removal device, respectively, or from another distillation zone or from an external source;

c. conducting distillation for at least a period of time without any addition of multi-component mixture to the distillation column system; and e. collecting a product stream enriched in the volatile component from the top of one distillation zone and a product stream enriched in the heavy component from the bottom of another distillation zone and a product stream enriched in one of the intermediate volatility component is collected from a distillation zone that is different from the two distillation zones producing streams enriched in the volatile and the heavy components.

Figure 1:
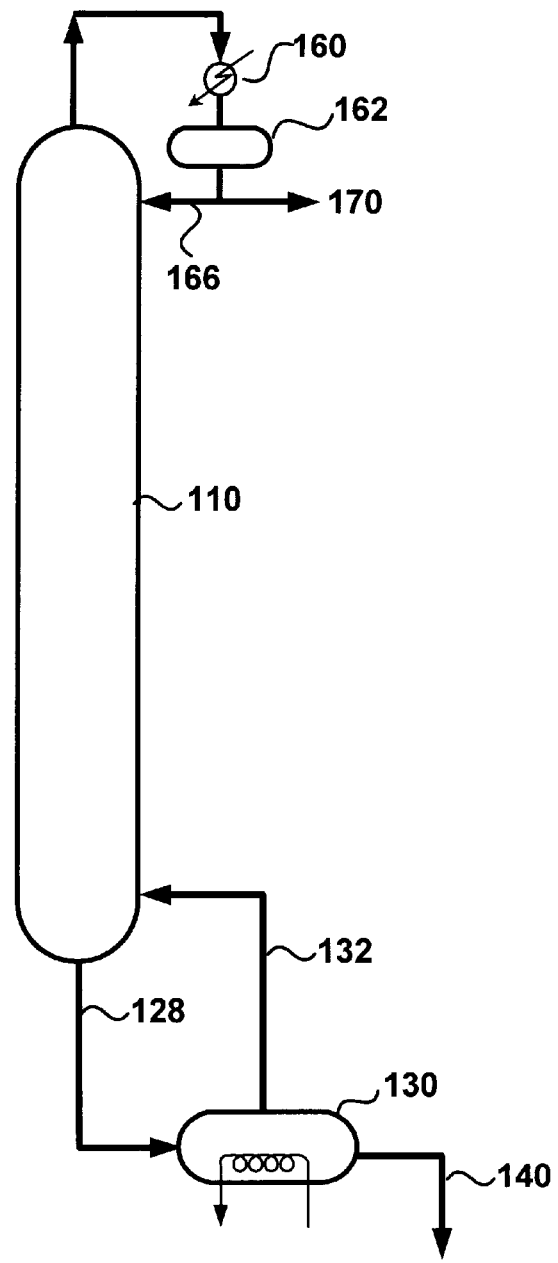
FIG. 1 is a schematic representation of a batch distillation column according to the prior art.

For the purpose of this invention, a distillation zone is defined as a section of a distillation column which is not interrupted by entering or exiting streams or heat flows. A distillation zone has a vapor entering at the bottom of the zone that travels up and leaves from the top of the zone. Similarly, a liquid stream enters at the top of the zone, and after intimate mass exchange with the ascending vapor stream, it leaves from the bottom of the distillation zone. No liquid or vapor stream is introduced at an intermediate location of the distillation zone. Similarly, no liquid or vapor stream is withdrawn from an intermediate location of the distillation zone. A distillation zone contains mass transfer devices to promote mass transfer between the ascending vapor and the descending liquid. Any known mass transfer device can be used for this purpose. Some examples include structured packing, dumped packing, sieve trays, bubble cap trays, valve trays, etc. In FIG. 1, the mass transfer section of the distillation column 110 between the liquid feed 166 and the vapor feed 132 constitutes a distillation zone.

The heat addition device is a device that at least partially converts a portion of the liquid exiting the distillation zone into a vapor stream and at least a portion of the vapor stream is fed back to the distillation zone. It will generally be a reboiler as the one shown in FIG. 1. The reboiler may be, for example, a thermosyphon or once-through reboiler. Any suitable arrangement can be used for this purpose. Steam or any other suitable hot stream or electric heaters may be used to provide heat in the reboiler. Similarly, a heat removal device is a device that at least partially converts a portion of the vapor exiting the distillation zone into a liquid stream and at least a portion of the liquid stream is fed back to the distillation zone. A condenser of the type shown in FIG. 1 may be used for this purpose. Cooling water or any other appropriate cold stream can be used in the condenser for heat removal.

For the purpose of explaining the invention in detail, first consider a multi-component mixture containing three components A, B, and C (ternary mixture ABC). A is the volatile component, C is the heavy component, and B is of intermediate volatility. The objective is to batch distill this ternary mixture into three product streams, each enriched in one of the components.

Figure 2:
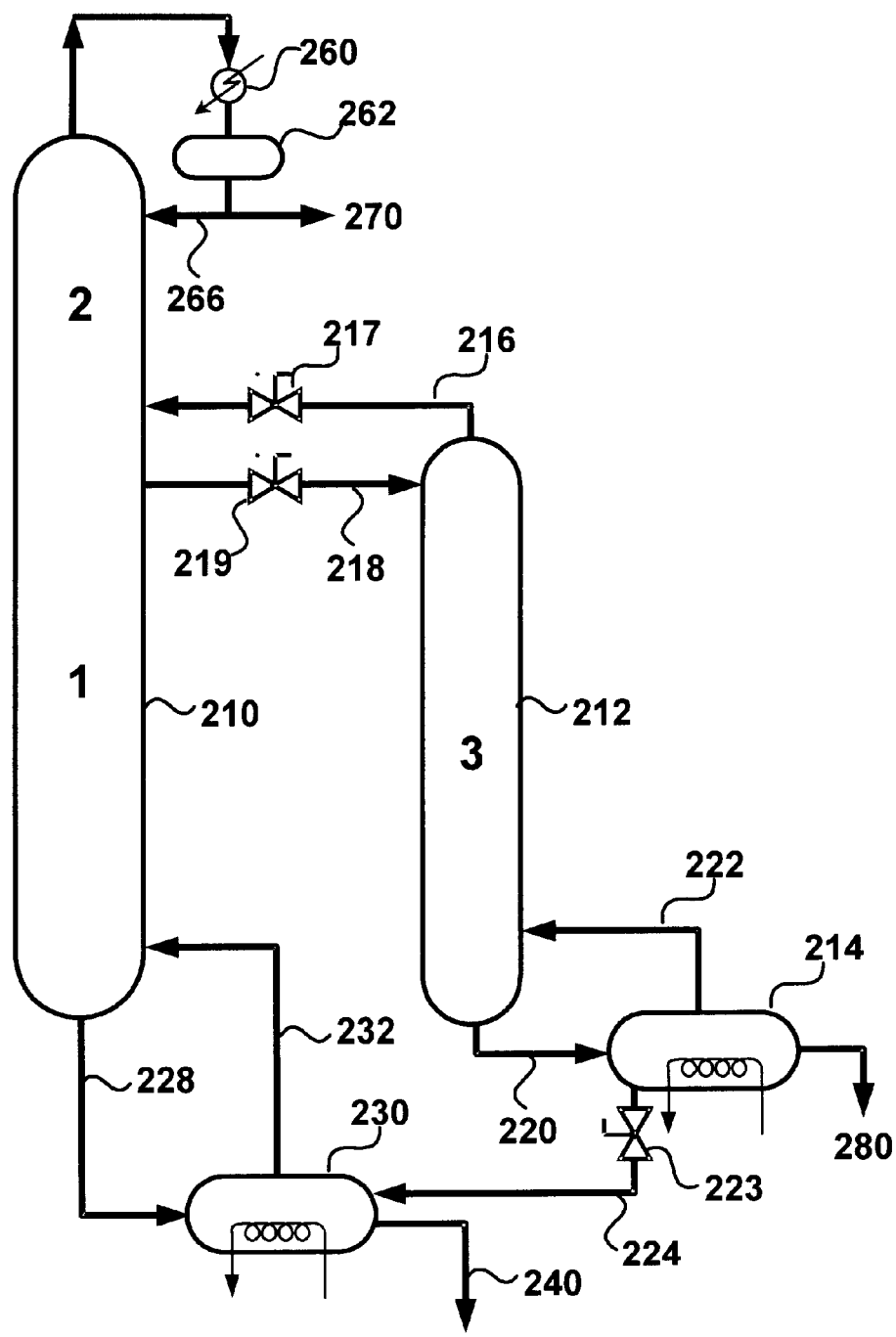
FIG. 2 is a schematic representation of a batch distillation column system with a side stripper in accordance with the present invention.

A batch distillation column system with a side stripper is shown in FIG. 2. This apparatus is obtained by adding the side stripper 212, reboiler 214, and the associated lines to the distillation column 110 of FIG. 1. In this apparatus, a liquid stream in line 218 is withdrawn from an intermediate location of the main distillation column 210 and fed to the top of the side stripper column 212. In return, a vapor stream 216 from the top of the side stripper is sent to the intermediate location of the main distillation column. Generally, the location of liquid withdrawal line 218 and vapor feed line 216 is at the same stage of separation in the main distillation column. For continuous feed distillation, U.S. Pat. No. 5,970,742 describes such a communication between the two distillation columns as a two-way communication. The boilup at the bottom of the side stripper is provided through reboiler 214. When needed, line 224 allows the transfer of liquid from reboiler 214 to reboiler 230. The ternary mixture ABC is initially charged to a suitable location in the distillation column system. After some distillation, product streams enriched in each of the components are recovered from lines 240, 270, and 280. The volatile component A is collected through line 270, the heavy component C through line 240 and intermediate volatility component B from line 280. The two distillation columns and associated reboilers, condenser, reflux drum 262 and the lines and valves shown in FIG. 2 constitute a distillation column system of the present invention.

Note that due to withdrawal of liquid in line 218 and vapor feed in line 216, the main distillation column 210 is divided into two distillation zones: an upper distillation zone 2 and a lower distillation zone 1. The side stripper column is another distillation zone, zone 3. Each of the distillation zones has a device that promotes mass transfer between the vapor and liquid phases. Generally, each distillation zone will have at least one stage of separation. A stage of separation means at least one tray (sieve, bubble or any suitable kind) or a few inches of packing (any dumped or any structured). The process in FIG. 2 has three distillation zones and liquid from the distillation zone 2 is divided between distillation zones 1 and 3. Similarly vapor streams from distillation zones 1 and 3 enter at the bottom of the distillation zone 2. The bottom end of the distillation zone 2 is in communication through both vapor and liquid flows with distillation zones 1 and 3.

There are several modes in which a ternary mixture ABC can be charged to the distillation column system and distilled into the respective product streams. For illustration purpose, some such modes will now be described.

In one mode of operation, all the liquid ternary mixture ABC would be charged to the reboiler 230. Valves 217 and 219 in the vapor and liquid lines between the main distillation column and the side stripper column are kept closed. Heat supply is started to the reboiler. The ascending vapor in the main distillation column is condensed in the condenser 260 and the liquid is allowed to descend through line 266 in the main distillation column 210. Through this time interval, no liquid product streams in line 270 and 240 are withdrawn. The operation proceeds until the liquid and vapor holdup in distillation zones 1 and 2 and in the reflux drum 262 are met. As the distillation proceeds, at some point in time, the concentration of the heavy component C near the liquid withdrawal line 218 of the main distillation column will be nearly zero or below an acceptable limit. In other words, the predominant components in vapor and liquid phases at the interface of distillation zones 1 and 2 would be A and B. This could also occur before all the holdup in the distillation zones 1 and 2 and the reflux drum 262 are achieved. However, once the concentration of heavy component C is below the acceptable value at the interface of distillation zones 1 and 2, the valve 219 is opened to allow some liquid AB to flow in the side stripper column through line 218. Valve 217 in the vapor line 216 is also opened. Once enough liquid is collected in the bottom reboiler 214, heat supply is started to the reboiler. During this operation, valve 223 in the line connecting the reboilers 214 and 230 is kept closed. Also no product in line 280 is initially collected. The distillation proceeds and the required holdup in the side stripper column and reboiler 214 are achieved. The distillation is continued until the concentration of the volatile component A in the reboiler 214 is below the acceptable limit and the liquid in this reboiler is rich in the intermediate volatility component B. Once the liquid in the reflux drum 262 achieves the desired purity of the volatile component A, this product stream is then collected through line 270 according to a suitable prescribed mode.

Some well-known modes are: (i) constant reflux ratio, (ii) variable reflux ratio, and (iii) optimal reflux ratio. Each of these prescribed modes is well known in the literature for the ordinary batch distillation described in FIG. 1. As product stream A is withdrawn, care has to be exercised to insure that the concentration of heavy component C at the interface of distillation zones 1 and 2 is always below the acceptable value. This is also true for the rate at which liquid in line 218 is withdrawn and fed to the side stripper column. Similarly, the intermediate volatility product stream B is collected in line 280. The product withdrawal rate in line 280 can be according to any suitable prescribed mode of operation. Some known modes for the batch stripper described earlier are: constant reboil ratio, variable reboil ratio and optimal reboil ratio. In the end, the heavy component C is collected from line 240 of reboiler 230.

Because all three components are collected from separate reboilers and the condenser, it is possible to operate the distillation column system such that either none or very little slop cut is collected. In an ordinary batch distillation, such as the one in FIG. 1, both components A and B are collected from the reflux drum 162. As a result, after the collection of A, a slop cut containing both A and B is collected from the reflux drum 162. This is because before B reaches to the desired high level of purity in the reflux drum, the contaminant A must be removed. This leads to the removal of slop cut containing both A and B. This slop cut is then stored and charged to the next distillation batch. In the new process of FIG. 2, product withdrawal rates in line 270 and 280 can be controlled so that there is no slop cut. If component B starts to reach closer to the reflux drum 262, then withdrawal rate of A can be reduced to insure liquid in the reflux drum 262 meets purity specification. During this period component B is continued to be withdrawn via line 280. Once the amount of B in the main distillation column 210 has decreased, then the withdrawal rate of component A can be again increased in line 270.

When the amount of B relative to A is low in the ternary mixture ABC, it may be possible to collect some of the volatile component A through line 270 before the valves 219 and 217 are open. This would delay bringing side stripper column 212 on stream until the concentration of B builds up in the main distillation column. This could also be true for certain cases when the relative volatility of A is much higher than B.

It was stated earlier that there are several modes in which a ternary mixture ABC can be charged to the distillation column system of FIG. 2 and distilled into product streams. Consider an alternative mode where valves 217 and 219 are always open. This means that there is always communication between the main distillation column 210 and the side stripper column 212. Now the liquid ternary mixture ABC is charged to the reboiler 230 and the initial operation to build the liquid holdup in the main distillation column and the reflux drum 262 are the same as described for the earlier operating mode. This time, however, some liquid will flow through line 218 to the side stripper column. In most cases, this liquid will initially have heavy component C. This heavy component will accumulate in the reboiler 214. As the distillation progresses, the concentration of heavy component C at the interface of distillation zones 1 and 2 will decline and at some point in time, the concentration of this component in the liquid line 218 will be below the acceptable limit. Finally, when the desired liquid holdup in reboiler 214 is achieved and the concentration of heavy component C is below the acceptable value, the intermediate volatility component B can be withdrawn through line 280. This will generally be the case when the relative volatility between components B and C is sufficiently large and/or concentration of C relative to B is sufficiently small in the ternary mixture ABC.

In cases where more than the desired quantity of heavy component C accumulates in the reboiler 214, and the product stream of desired B purity cannot be withdrawn from line 280, some quantity of liquid must be purged from the reboiler 214. Preferably, this purged liquid is sent through valve 223 and line 224 to the reboiler 230. This liquid transfer from reboiler 214 to the reboiler 230 can be done in more than one way. In one option, heat to reboiler 214 is not initially applied. Liquid containing heavy component C as it travels down the side stripper column and into line 220 is immediately sent to the reboiler 230. This could be done through reboiler 214, valve 223 and line 224. Alternatively, a bypass line (not shown in FIG. 2) bypassing the reboiler 214 and directly connecting line 220 with line 224 could be used for this purpose. In this case, the valve in the bypass line is initially open to allow heavy component C containing liquid to directly go to the reboiler 230. Once the concentration of C is below the desired amount, the valve in the bypass line is closed and the liquid in line 220 is directed to the reboiler 214. Once enough liquid is collected in reboiler 214, heat supply to this reboiler can be started. As distillation proceeds, desired purity of B in reboiler 214 is achieved and the rest of the procedure for collecting product streams is as described earlier. In the second option for the transfer of heavy component C containing liquid from reboiler 214 to reboiler 230, all the descending liquid in line 220 is directly sent to reboiler 214 and after adequate holdup heat is supplied to this reboiler. Eventually valve 223 is opened and a small amount of liquid flows from reboiler 214 through valve 223 and line 224 to reboiler 230. In due course, the concentration of heavy component C drops in reboiler 214 to a level that is below the acceptable level. At this point, valve 223 is closed and the distillation progresses as described before.

In another mode of operation, the ternary mixture ABC is initially charged to the reboiler 230. A pure A stream, a pure B stream, or an AB mixture containing both A and B but no heavy component C is charged to the reflux drum 262. As heat is supplied to the reboiler 230, the liquid flow in line 266 is started. As a liquid stream lean in C descends the main distillation column, it removes the heavy component C from the ascending vapor. As a result, concentration of heavy component C at the interface of distillation zones 1 and 2 can be maintained below the acceptable level. In this case, even if the valves 217 and 219 are open from the start of the distillation, the quantity of heavy component C in side stripper column is kept below the acceptable level. This eliminates the need to purge a liquid stream from reboiler 214. The rest of the distillation proceeds as described above.

In yet another mode of operation, the ternary mixture ABC is not only initially charged in reboiler 230 but a portion is charged in reboiler 214. Heat is supplied to both reboilers simultaneously and valves 217 and 219 are kept open. This accelerates the buildup of liquid and vapor holdup in the distillation column system. Once the concentration of C in line 218 drops below a preset amount, a liquid flow in a predetermined quantity is started through valve 223 in line 224 to reboiler 230. The amount of liquid supply through line 218 exceeds the amount of vapor formed in line 222. This makes it possible to transfer some liquid from reboiler 214 to reboiler 230. Eventually, the component of intermediate volatility B builds up in reboiler 214 and the concentration of heavy component C drops below the acceptable value. Then valve 223 is closed and distillation progresses as described before.

As a side note, for the operating modes where valves 217 and 219 are kept open from the start of the batch campaign, the distillation zone 3 and the associated reboiler 214 could be interchangeably used with the distillation zone 1 and the associated reboiler 230. In other words, the ternary mixture ABC could be charged to reboiler 214 instead of reboiler 230 and now the purge stream containing heavy component C will have to be removed from reboiler 230. At some point in the operation, heavy component C containing the purge stream will have to be transferred from reboiler 230 to reboiler 214. Eventually, intermediate volatility component B will be collected from the reboiler 230 and heavy component C from reboiler 214.

It is clear from the proceeding description that the batch distillation column system of the present invention is quite flexible. There are many modes in which it can be operated. Use of the side stripper column and the associated reboiler 214 along with the conventional apparatus of FIG. 1 provides a great deal of flexibility. The operating mode of choice will depend on the multi-component mixture (the ternary mixture ABC) composition, relative volatilities, and the amount of feed available for a given batch. When more than one operating mode is equally attractive, then one may pick a choice based on one's preference for controllability.

The distillation column system of FIG. 2 is indeed very flexible. For example, when needed for certain multi-component mixtures, it can also be operated in a manner that is very similar to ordinary distillation described in FIG. 1. For example, a multi-component mixture can be charged to both the reboilers 214 and 230. Valve 217 and 219 are kept open. Heat is supplied in amounts proportional to the cross-sectional areas of distillation zones 1 and 3. Both distillation zones 1 and 3 operate with similar liquid and vapor flow ratios. Each is a column operating in parallel with the other. It is as if the bottom section of the distillation column 110 in FIG. 1 has been divided in to two parts. The rest of the distillation is similar to the one known for ordinary batch distillation. In another option, all the multi-component mixture is charged to one reboiler, e.g., 230. All of the liquid in line 220 is sent to this reboiler 230 through a bypass line (not shown in FIG. 2). Some of the vapor in line 232 is sent to distillation zone 3 through another bypass line containing a control valve (not shown in FIG. 2) that is connected to line 222. In this case, reboiler 214 is totally bypassed. The rest of the distillation system steps are similar to the ones known for an ordinary batch distillation system.

In FIG. 2, distillation zones 1 and 3 may or may not have an equal number of separation stages. Generally, to keep the distillation column system flexible, one might build the column system with a similar number of separation stages in distillation zones 1 and 3. It means both will have a similar number of trays or a similar height of packing. However, depending on compositions of multi-component mixtures to be distilled and the relative volatilities, each of the distillation zones may require quite a different number of separation stages. The distillation column system may be built accordingly.

In several of the operating modes, a liquid stream needs to be transferred from reboiler 214 to the reboiler 230 via line 224. This can be accomplished in a number of ways. In FIG. 2, reboiler 214 is shown at an elevated height as compared to reboiler 230. It means that liquid can flow under the influence of gravity. On the other hand, a pump may be installed between the two reboilers. Similarly, if needed, a pump may be installed in the liquid transfer line 218 or liquid may be allowed to flow in this line under the influence of gravity.

Finally, it is worth noting that a large number of ordinary batch distillation columns are currently in operation. The novel arrangement of FIG. 2 can also be used for a retrofit to debottleneck existing columns. This will involve the addition of side stripper column 212, reboiler 214 and the associated valves and lines. In most cases, this will increase the production of each distillate stream and potentially cut the batch campaign time.

Figure 3:
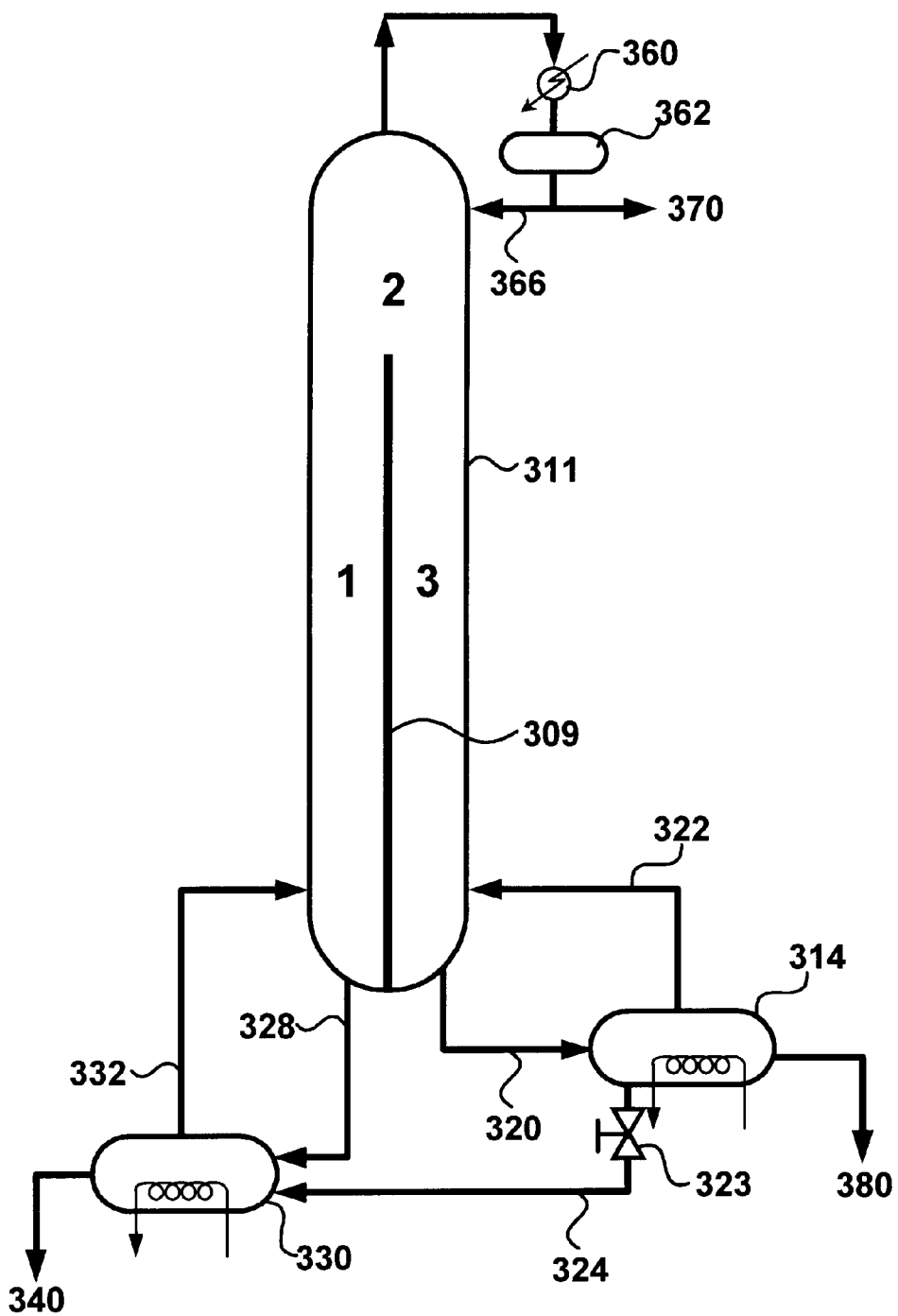
FIG. 3 is a schematic representation of a batch distillation column system having a divided wall side stripper in accordance with the present invention.

It was stated earlier that cost reduction for continuous multi-component feed distillation columns with thermal coupling has been suggested in the prior art by building two or more distillation columns in a single shell column. Such known techniques can be applied to the batch distillation apparatuses of the current invention. For example, the distillation zones 1 and 3 of FIG. 2 can be built within one column with a suitable partition. One such arrangement is shown in FIG. 3. In this figure, distillation columns 210 and 212 are combined in one shell 311. A wall 309 partitions the bottom section of the column 311 into two distillation zones 1 and 3. Each side of the wall has adequate separation stages. Liquid descending distillation zone 2 is distributed between distillation zones 1 and 3. Similarly, vapor ascending distillation zones 1 and 3 provides the needed vapor stream for the distillation zone 2. A comparison of FIGS. 2 and 3 shows that the operation of the distillation column system in FIG. 3 is similar to the case when valves 217 and 218 in FIG. 2 are always open. Therefore, all operating modes described earlier for the distillation column system in FIG. 2 with valves 217 and 219 always open are also applicable to the distillation column system of FIG. 3. Once again, it is not necessary to have the same number of separation stages in distillation zones 1 and 3. The number of separation stages in each distillation zone can be optimized for multi-component mixture conditions and the associated operating conditions (boilup and reflux ratios).

Figure 4:
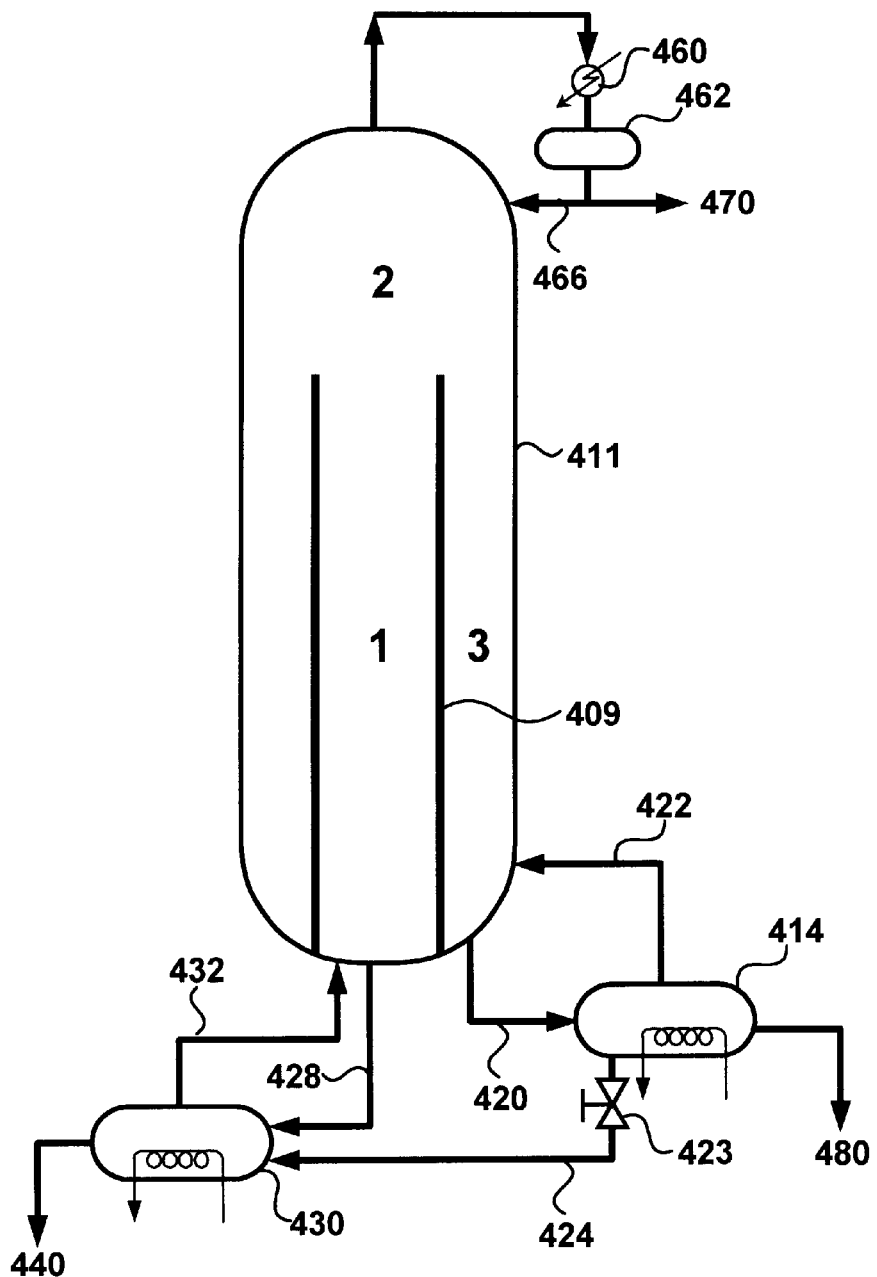
FIG. 4 is a schematic representation of a batch distillation column system having a concentric cylinder side stripper in accordance with the present invention.

In FIG. 3 the two partitions can be obtained by the use of a divided wall or by any other known means. U.S. Pat. No. 6,240,744 provides some alternatives. A cylinder inside a cylinder, a square or rectangular prism inside a cylinder, a triangular prism inside a cylinder are some of the examples. In FIG. 4, two partitions for distillation zones 1 and 3 are obtained by using a concentric cylinder 409 of smaller diameter inside a larger diameter cylinder 411. The annular space between the two cylinders is distillation zone 3 and the inner space in the smaller diameter cylinder 409 is distillation zone 1. The rest of the distillation column system is similar to one described in FIG. 3. In FIG. 4, the inside cylinder 409 starts at the bottom of the outer cylinder 411. This feature is not essential. The internal cylinder may extend much below the external cylinder 411 or vice versa. The final configuration will depend on the applications at hand.

The distillation configurations of FIGS. 2–4 result when the current invention is applied to ordinary batch distillation. The configurations in FIGS. 5 and 6 result when the current invention is applied to a batch stripper. Now a side rectifier column is added to the main distillation column and the multi-component mixture is initially charged to the reflux drum at the top of the main distillation column.

Figure 5:
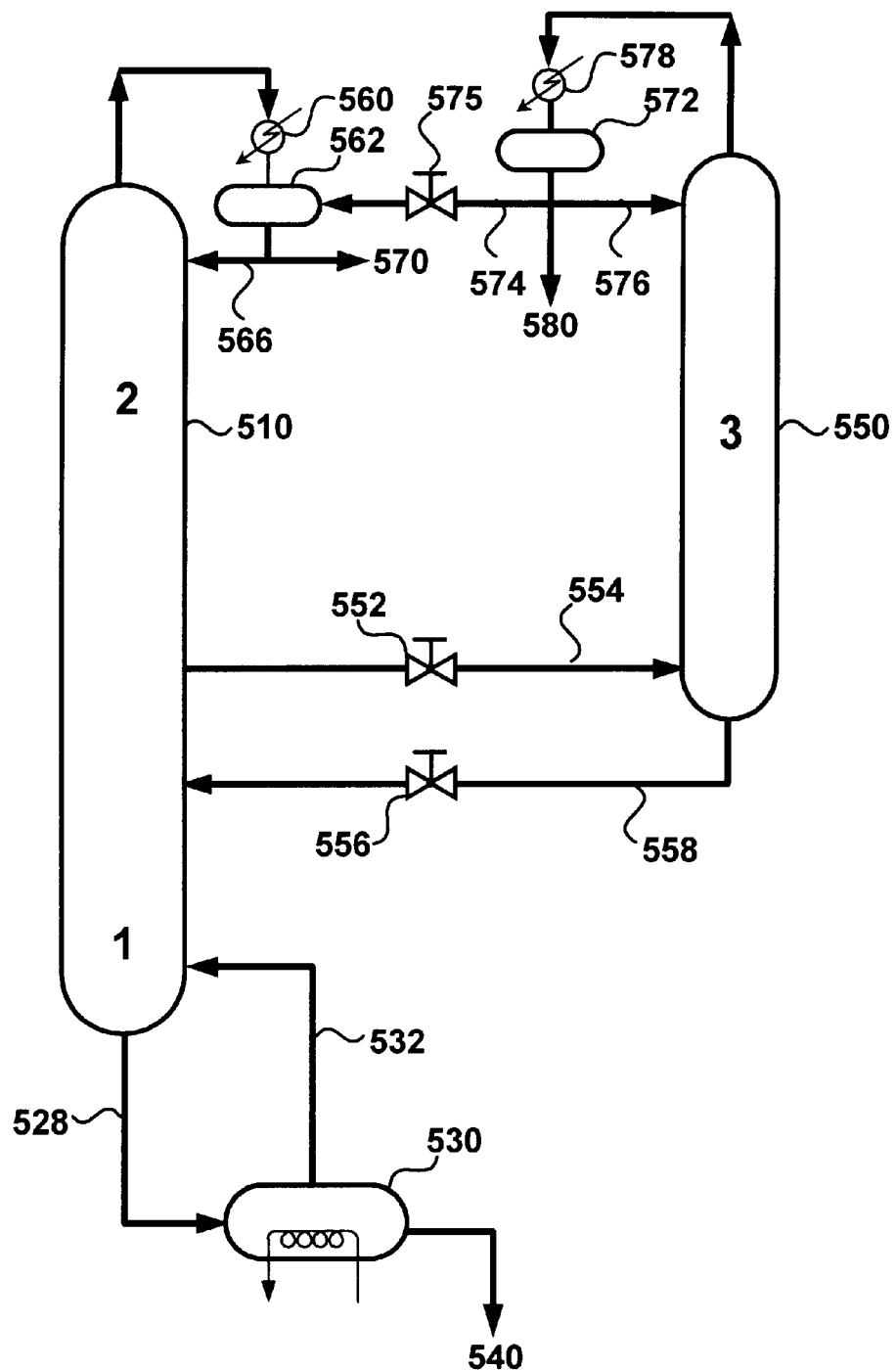
FIG. 5 is a schematic representation of a batch distillation column system having a side rectifier in accordance with the present invention.

In FIG. 5 a side rectifier column 550 with a two-way communication through lines 554 and 558 with the main distillation column 510 is used. In this configuration, at least a significant fraction of the ternary mixture ABC is initially charged in the reflux drum 562. As the liquid descends through line 566 in the main distillation column, it goes to the reboiler 530. Heat is supplied to the reboiler 530 and vapor is sent to the main distillation column through line 532. The vapor stream leaving the distillation zone 1 is divided into two parts. One part goes to distillation zone 2 and the other portion goes through line 554 to distillation zone 3 in the side rectifier column. The liquid from the distillation zone 3 is transferred through line 558 to the main distillation column. The liquids from distillation zones 2 and 3 are sent to distillation zone 1. Thus the upper end of distillation zone 1 is in communication through both vapor and liquid flows with distillation zones 2 and 3. The vapor ascending the distillation zone 3 is condensed in condenser 578 and sent to the reflux drum 572. Liquid reflux to distillation zone 3 is provided through line 576. Similarly, the vapor leaving the distillation zone 2 is condensed in condenser 560 and sent to the reflux drum 562. After the distillation has proceeded for a time period with a prescribed mode, the product streams are collected. The heavy component C is collected through line 540, the volatile component A through line 570 and the component B of intermediate volatility from line 580. The two distillation columns and associated reboiler, condensers, reflux drums and the lines and valves shown in FIG. 5 constitute a distillation column system of the present invention.

In analogy to the side stripper configuration, there are several operating modes for a side rectifier configuration of FIG. 5. Rather than discussing an exhaustive list of operating modes, one such mode will now be discussed. Most of the liquid ternary mixture ABC is initially charged to reflux drum 562. Valves 575, 552, and 556 are kept closed. A small portion of the liquid feed is also charged to the reboiler 530. Heat is supplied to the reboiler and vapor is introduced through line 532 to the bottom of main distillation column 510. No product streams are collected through lines 540, 570, and 580. Some liquid reflux is also introduced through line 566 at the top of the main distillation column. The column develops its liquid and vapor holdups. The vapor from the top of the main distillation column is condensed in the condenser 560 and sent to reflux drum 562. The cooling duty in the condenser 560 may be provided through any suitable coolant such as cooling water. Similarly heating duty in the reboiler can be provided through any suitable heating medium such as steam. As the distillation progresses, the components that are more volatile than the heavy component C are driven away from the reboiler 530. When the concentration of component A at the interface of distillation zones 1 and 2 is below an acceptable value, valve 552 is opened to allow the flow of some vapor predominantly composed of components B and C to the side rectifier column 550. The vapor stream leaving distillation zone 3 is condensed in condenser 578 and sent to the reflux drum 572. As liquid holdup is developed in reflux drum 572, some liquid is initially returned through line 576 to the top of the distillation zone 3. Valve 556 is opened after some liquid accumulates in the bottom sump of the side rectifier column 550. Valve 556 controls the liquid flow from the side rectifier column to the main distillation column 510 through line 558. Distillation proceeds till all the liquid and vapor hold ups in the distillation column system are met and the purity of intermediate volatility component B in reflux drum 572 and of heavy component C in reboiler 530 are achieved. Then the product streams are withdrawn through lines 540 and 580 according to a suitable prescribed mode. Some known prescribed mode for liquid reflux to the side rectifier column are: (i) constant reflux ratio, (ii) variable reflux ratio, and (iii) optimal reflux ratio. Similarly the vapor boilup modes for the bottom of the main distillation column are: (i) constant reboil ratio, (ii) variable reboil ratio and (iii) optimal reboil ratio. In any event, the vapor reboil flow through line 532 and the vapor flow through line 554 are controlled such that the concentration of volatile component A is always below the acceptable limit at the interface of distillation zones 1 and 2. Once the components B and C have been collected through lines 580 and 540 respectively, and the concentrations of component B and C have dropped below the desired values in reflux drum 562, component A can be withdrawn through line 570.

In analogy with the side stripper configuration of FIG. 2, for those operating modes when the valves in lines 552 and 556 are kept open from the start of the batch distillation campaign, the volatile component A will accumulate in the reflux drum 572. If its concentration is above the acceptable limit for the product stream with intermediate volatility component B, then a purge stream must be taken through line 574. For this purpose, valve 575 is kept open for a period of time till the concentration of A is below the acceptable limit in the reflux drum 572 and line 576. Once again the purge liquid in line 574 may be sent either through the influence of gravity or a pump may be used in this line. In an alternative mode, it is possible to keep the concentration of A low in the reflux drum 572 without any need for a purge stream through line 574. For this purpose, all the liquid ternary mixture ABC is initially charged in the reflux drum 562 but no liquid through line 566 is initially introduced in the main distillation column 510. The reboiler 530 is initially charged with a liquid that does not contain A and is made up of B or C or both. Heat is initially supplied to reboiler 530 and a vapor stream free of A enters the bottom of main distillation column through line 532. Once this vapor stream reaches the top of the main distillation column, it is condensed in the condenser 560 and sent to the reflux drum 562. Now a liquid is introduced with a controlled rate through line 566. The liquid and vapor flows in the main distillation column are controlled such that concentration of the volatile component A is always below the acceptable level at the interface of distillation zones 1 and 2. This will insure, that the concentration of component A in line 554 will always be below the acceptable level. Since there is no significant accumulation of A in reflux drum 572, there will be no need for purge through line 574. The rest of the operating procedure will be similar to the one described earlier.

The novel arrangement of FIG. 5 can also be used for retrofit to debottleneck the existing batch stripper columns. This will involve the addition of the side rectifier column 550, condenser 578, reflux drum 572 and the associated valves and lines. In most cases, this will increase the production and cut the batch campaign time.

Figure 6:
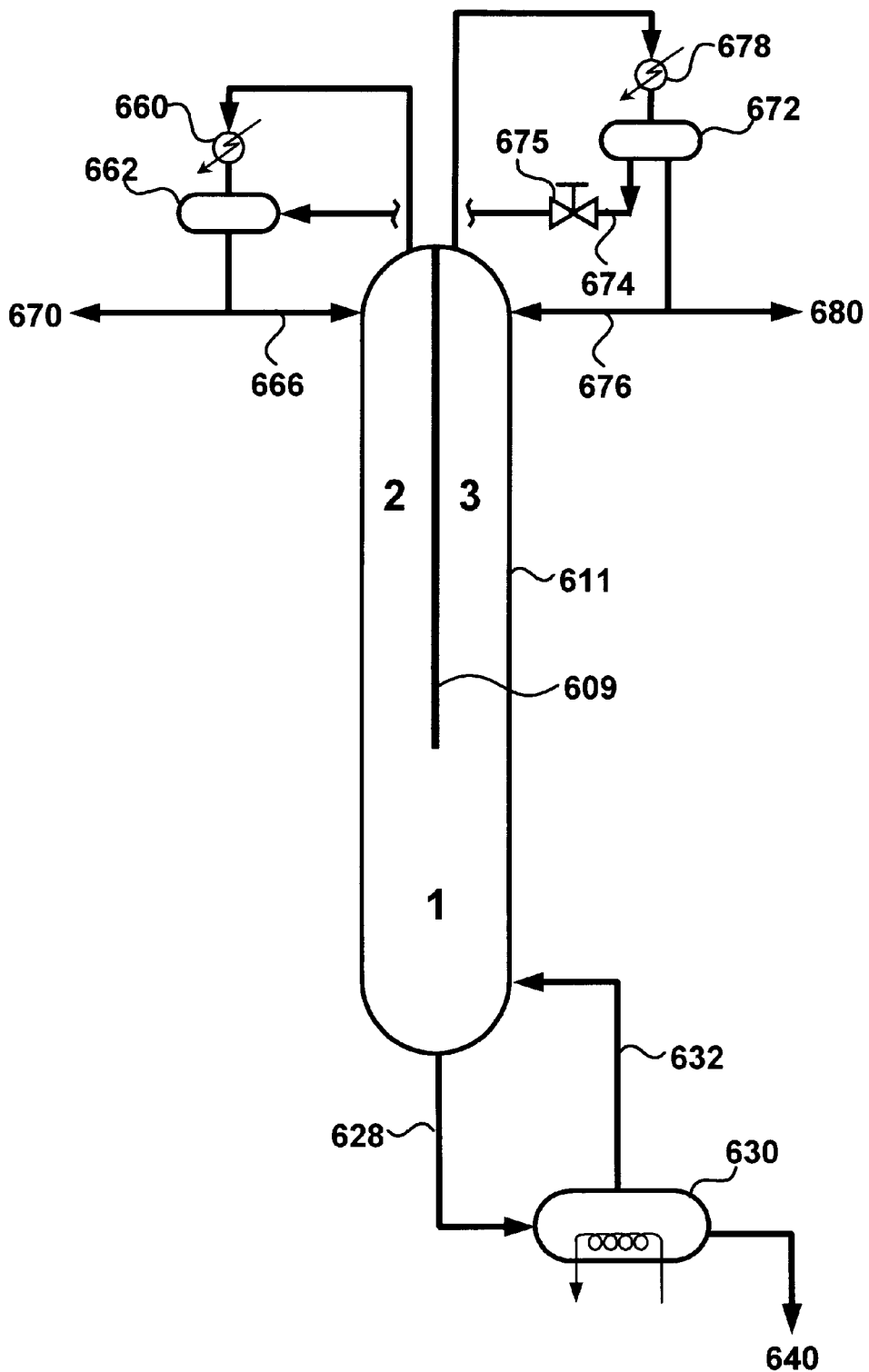
FIG. 6 is a schematic representation of a batch distillation column system having a divided wall side rectifier in accordance with the present invention.

Just as the side stripper configuration of FIG. 2 can be built in a single column shell with partitions (FIGS. 3 and 4), similarly the side rectifier configuration can also be built in a single column shell with partitions. FIG. 6 shows one such example. In a single column shell 611, a divided wall 609 is installed to provide distillation zones 2 and 3. The vapor from distillation zone 1 is divided between distillation zones 2 and 3 and liquid streams from distillation zones 2 and 3 are sent to distillation zone 1. There are many ways to create such partitions that mimic the performance of the side rectifier configuration of FIG. 5. FIG. 6 shows just one of the examples. FIG. 6 operates analogous to FIG. 5 when valves in lines 554 and 558 are open from the start of the batch campaign.

Figure 7:
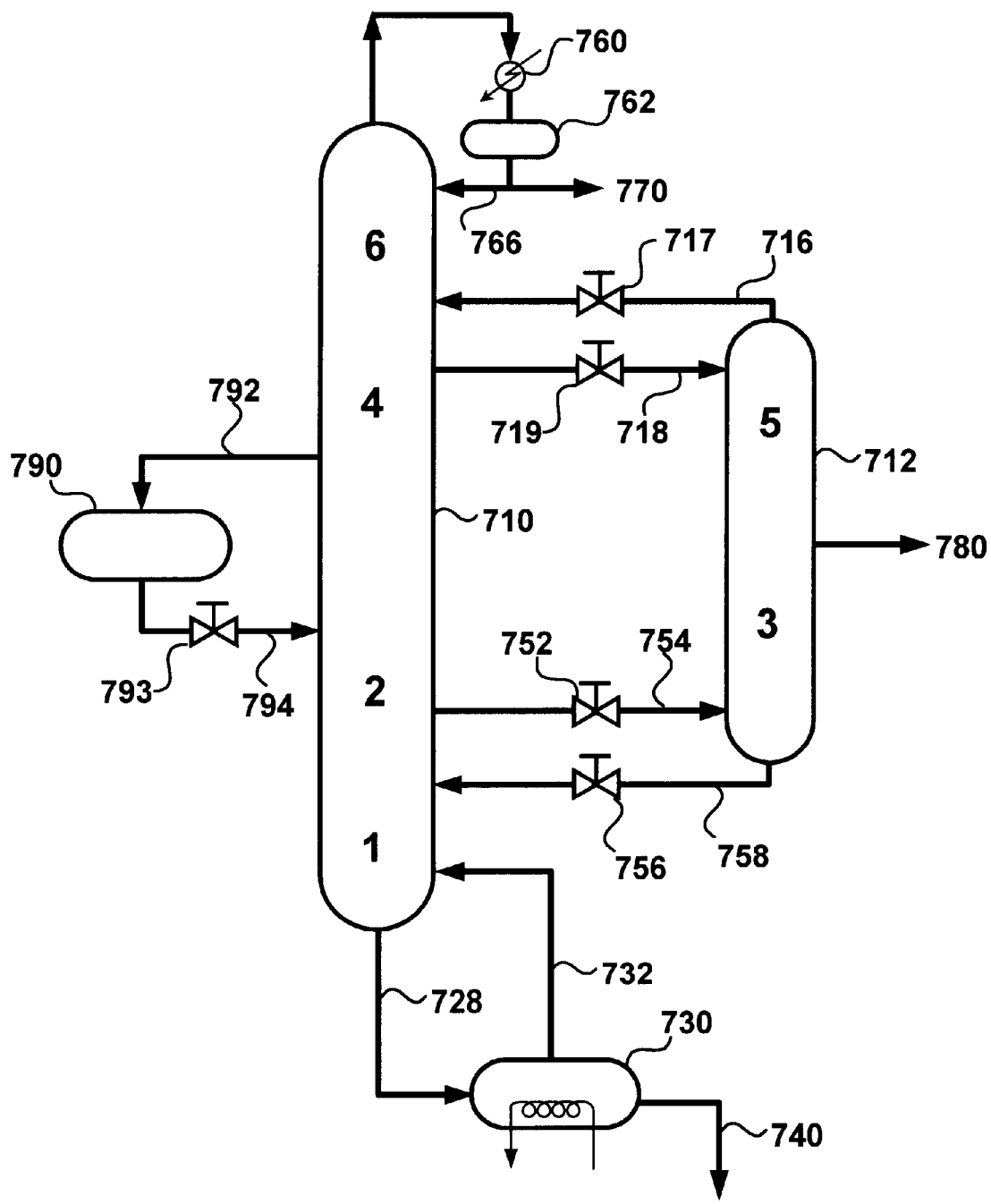
FIG. 7 is a schematic representation of a batch distillation column system having a middle vessel, fully-coupled design in accordance with the present invention.

A novel batch distillation configuration currently described in the literature is the middle vessel column. The current invention can be easily applied to a middle vessel column and a resulting configuration is shown in FIG. 7. A middle vessel 790 is connected to the main distillation column 710 through lines 792 and 794. A distillation column 712 is connected at both the ends through two-way communication with the main distillation column 710. The upper end of the distillation column 712 is connected through a vapor transfer line 716 and a liquid transfer line 718 with the main distillation column. There is at least one separation stage in the main distillation column between the liquid withdrawal line 792 and the liquid withdrawal line 718. This leads to distillation zone 4. Similarly, there is a distillation zone 6 between the vapor feed line 716 and the liquid reflux line 766. The bottom of the distillation column 712 is connected to the main distillation column through vapor transfer line 754 and liquid transfer line 758. There is a distillation zone 1 between the vapor feed line 732 and the liquid feed line 758. A distillation zone 2 is located between the liquid feed line 794 and the vapor withdrawal line 754. The upper end of the distillation zone 1 is in communication through both vapor and liquid flows with distillation zones 2 and 3. The lower end of distillation zone 6 is in communication through both vapor and liquid flows with distillation zones 4 and 5. The upper end of the distillation zone 6 receives its liquid reflux through line 766 and the bottom end of the distillation zone 1 receives its vapor boilup through line 732. Vapor flow rate for distillation zone 5 comes from distillation zone 3 and the liquid reflux for the distillation zone 3 comes from distillation zone 5. The liquid ternary mixture ABC is charged to the middle vessel 790. A liquid stream is withdrawn from the main distillation column in line 792 and sent to the middle vessel and some liquid is returned through line 794 to the main distillation column. The component of intermediate volatility is withdrawn through line 780 between distillation zones 3 and 5. The heavy component C is withdrawn from line 740 and the volatile component A through line 770. The two distillation columns and associated reboiler, condenser, middle vessel, reflux drum and the lines and valves shown in FIG. 7 constitute a distillation column system of the present invention.

There are several modes of operation for the middle vessel column of FIG. 7. For illustration, one possible mode of operation is now described. The liquid ternary mixture ABC is initially charged to the middle vessel 790. Valves 717, 719, 752, 756 are kept closed and no product streams are collected from the distillation column system. Some liquid is introduced through line 794 to the main distillation column 710. Heat is supplied in the reboiler 730. Reflux is provided through the condenser 760 and reflux drum 762 and line 766. All the liquid descending distillation zone 4 is sent via line 792 to the middle vessel. Distillation proceeds till all the holdups are met. Once the concentration profiles in the main column 710 are developed, such that the concentration of the volatile component A is below an acceptable level at the interface of distillation zones 1 and 2 and of heavy component C is below an acceptable level at the interface of distillation zones 4 and 6, then valves 717, 719, 752 and 756 are opened. The component of intermediate volatility B is collected through line 780. Other two components are also collected from their respective outlets.

In situations where the product streams collected from line 780 for a time period does not meet purity specification, it can be collected and transferred back to the middle vessel 790. This will generally be the case when all valves 717, 719, 752 and 756 are open from the start of the distillation campaign. Then in the early part of the distillation campaign, product collected from line 780 can contain appreciable quantities of A and C. This cut from the early part can be transferred to the middle vessel 790 till the product collected from line 780 meets the purity of product B. It is also worth noting that for certain operating modes, at the end of the distillation, one may be able to collect component of intermediate volatility B from the middle vessel. This will be in addition to the collection of intermediate volatility component B through line 780.

It is worth noting that the configuration in FIG. 7 can also be used to batch distill a multi-component mixture even when the middle vessel 790 and the associated line 792 and 794 are not used. For this purpose, the multi-component mixture can be initially charged in the reboiler 730 and distillation is started by supplying heat to the reboiler. Valves 717, 719, 752 and 756 are kept closed. As the distillation proceeds, it is operated such that all the A from a ternary mixture ABC leaves the reboiler and accumulates as binary mixture AB in the reflux drum 762. The reboiler contains binary mixture BC. The concentration of heavy component C is below the acceptable limit between distillation zones 4 and 6. Similarly, concentration of the light component A is below the acceptable limit between distillation zones 1 and 2. Now valves 717, 719, 752 and 756 are opened. As distillation proceeds, component of intermediate volatility B is collected through line 780. A is collected from line 770 and C from 740. A similar procedure could be used for a case when all the multi-component mixture is initially charged to the reflux drum 762.

Figure 8:
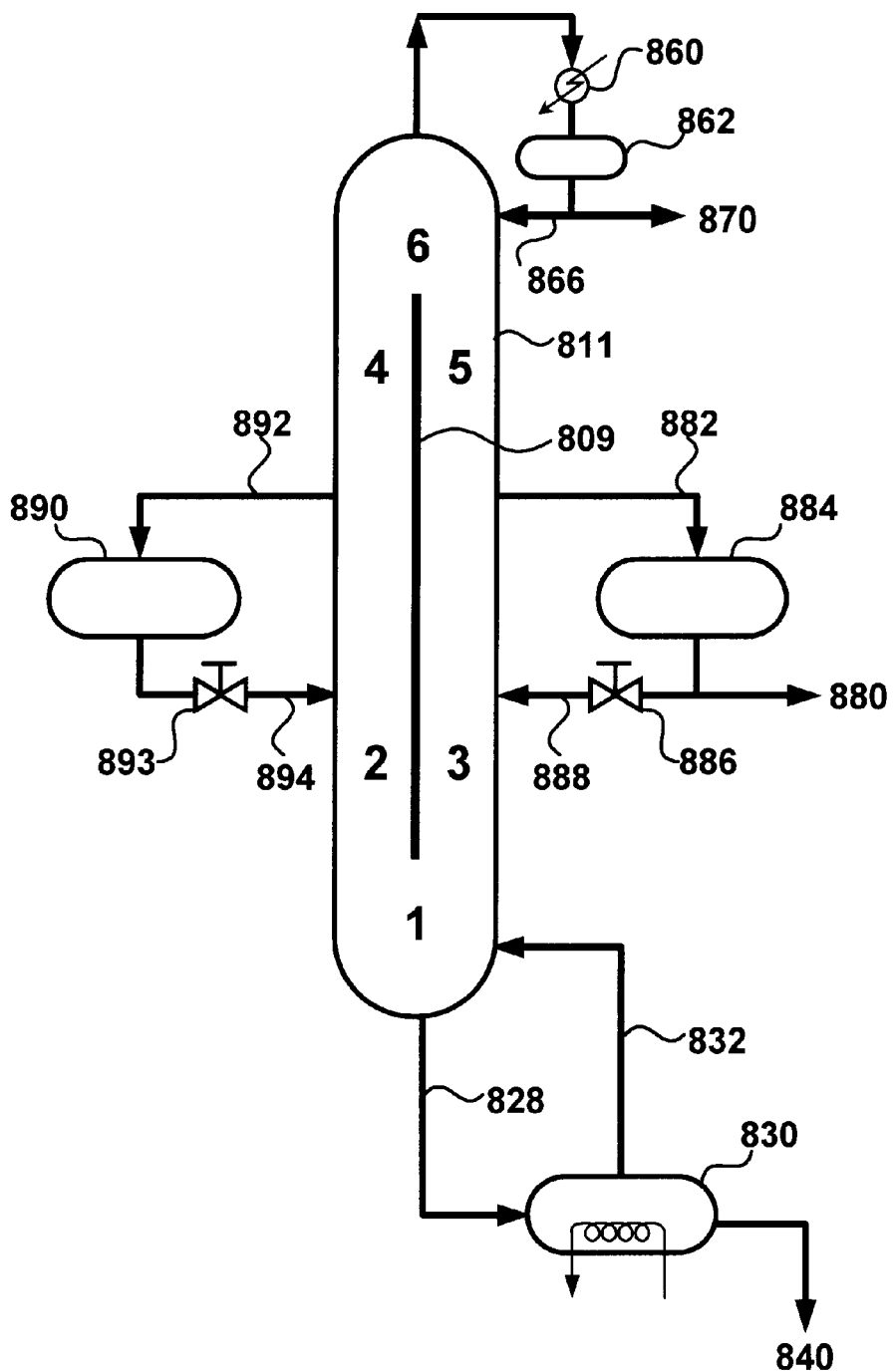
FIG. 8 is a schematic representation of a batch distillation column system having a divided wall, fully-coupled design with an intermediate product tank in accordance with the present invention.
Figure 9:
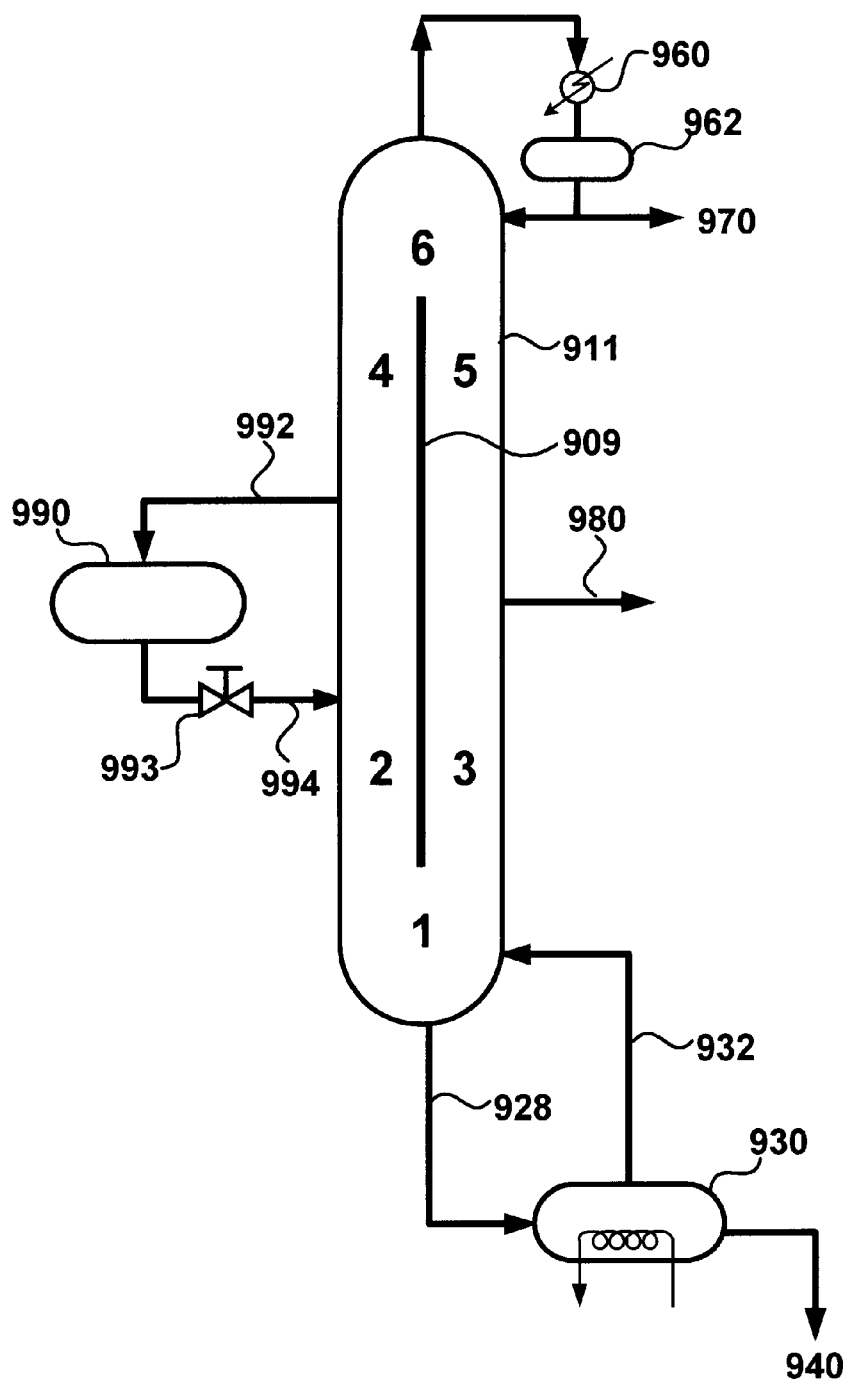
FIG. 9 is a schematic representation of a batch distillation column system having a divided wall, fully coupled design in accordance with the present invention.

Similar to the side stripper and side rectifier configurations for batch distillation, the middle vessel configuration can also be built in a single shell column. An example is shown in FIG. 8. A divided wall 809 runs from an intermediate location to another intermediate location of the distillation column 811. This configuration is similar to the one shown in FIG. 7 when all the valves in lines between main distillation column 710 and the distillation column 712 are open. The only difference is that an optional additional vessel 884 is installed between distillation zones 5 and 3. Liquid from distillation zone 5 is sent through line 882 to this vessel and some liquid can be returned to distillation zone 3 through line 888. At the start of the run when the liquid in line 882 is not pure in the intermediate volatility component, the return line 888 may be used. Once purity is established, product from line 880 is collected. Alternatively, when the purity of B is not established in the additional vessel 884, the liquid from this vessel could be pumped to the middle vessel 890 (this connection not shown in the figure). This could be done in lieu of transfer of liquid through line 888 to the distillation column 811. In another alternative, additional vessel 884 may not be used at all and the product stream for intermediate volatility component B can be withdrawn directly from the space between distillation zones 3 and 5 as shown in FIG. 9.

The middle vessel concept can also be used with the side stripper configurations shown in FIGS. 2–4 and the side rectifier configurations shown in FIGS. 5 and 6.

Figure 10:
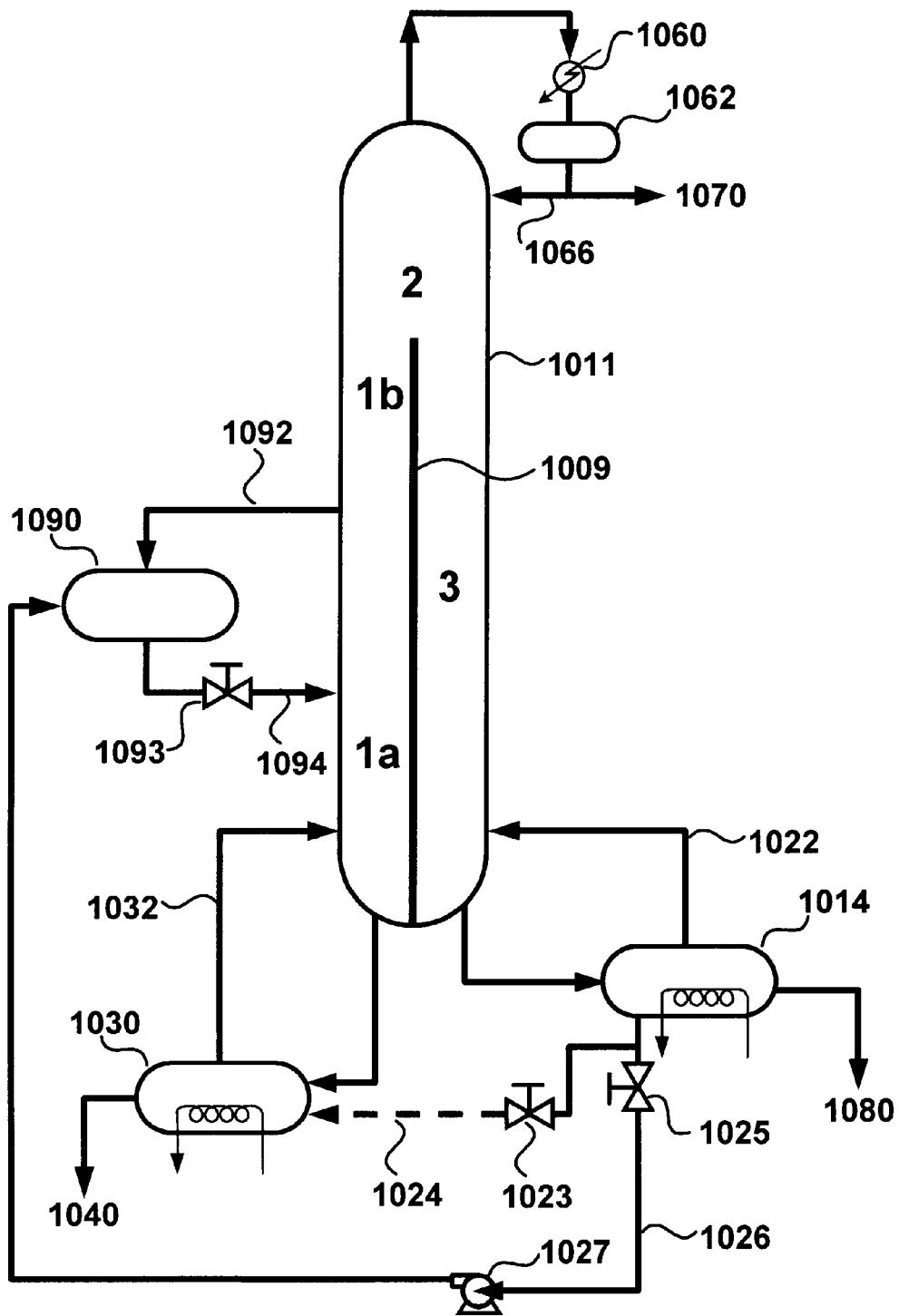
FIG. 10 is a schematic representation of a batch distillation column system having a middle vessel and a divided wall side stripper in accordance with the present invention.

When the middle vessel concept is applied to the divided wall side stripper batch distillation (FIG. 3), one resulting configuration is shown in FIG. 10. The middle vessel 1090 along with lines 1092 and 1094 is connected to the main distillation column 1011. The distillation zone 1 in FIG. 3 is now divided into distillation zones 1a and 1b. The liquid ternary mixture ABC is initially charged to the middle vessel. It is fed at a controlled rate through line 1094 to distillation zone 1a. The descending liquid is boiled in reboiler 1030 and the vapor boilup to the column system is provided through line 1032. The condensed liquid descending from distillation zone 2 is distributed between distillation zones 1b and 3. The liquid leaving distillation zone 1b is sent through line 1092 to the middle vessel 1090. Liquid descending distillation zone 3 is sent to reboiler 1014 and boiled to provide vapor 1022. Liquid initially collected in reboiler 1014 will be contaminated with heavy component C and may render product off specification. In such a case, initial liquid from this reboiler needs to be purged. Unlike the configuration in FIG. 3, one has now additional choice to transfer this liquid through valve 1025, line 1026 and pump 1027 to the middle vessel 1090. When line 1024 is not chosen to transfer the purge stream to reboiler 1030, components more volatile than the heavy component C can be kept out of the reboiler 1030. As distillation proceeds and the purity levels are established, all three product streams may be simultaneously withdrawn from the distillation column system. The product stream containing A through line 1070, containing B through line 1080 and C through line 1040. Ultimately the liquid level in the middle vessel 1090 will drop below the acceptable level and distillation would be terminated. Under certain operating modes, at the end of the run, middle vessel 1090 may contain B-rich liquid and could be one of the product streams.

Figure 11:
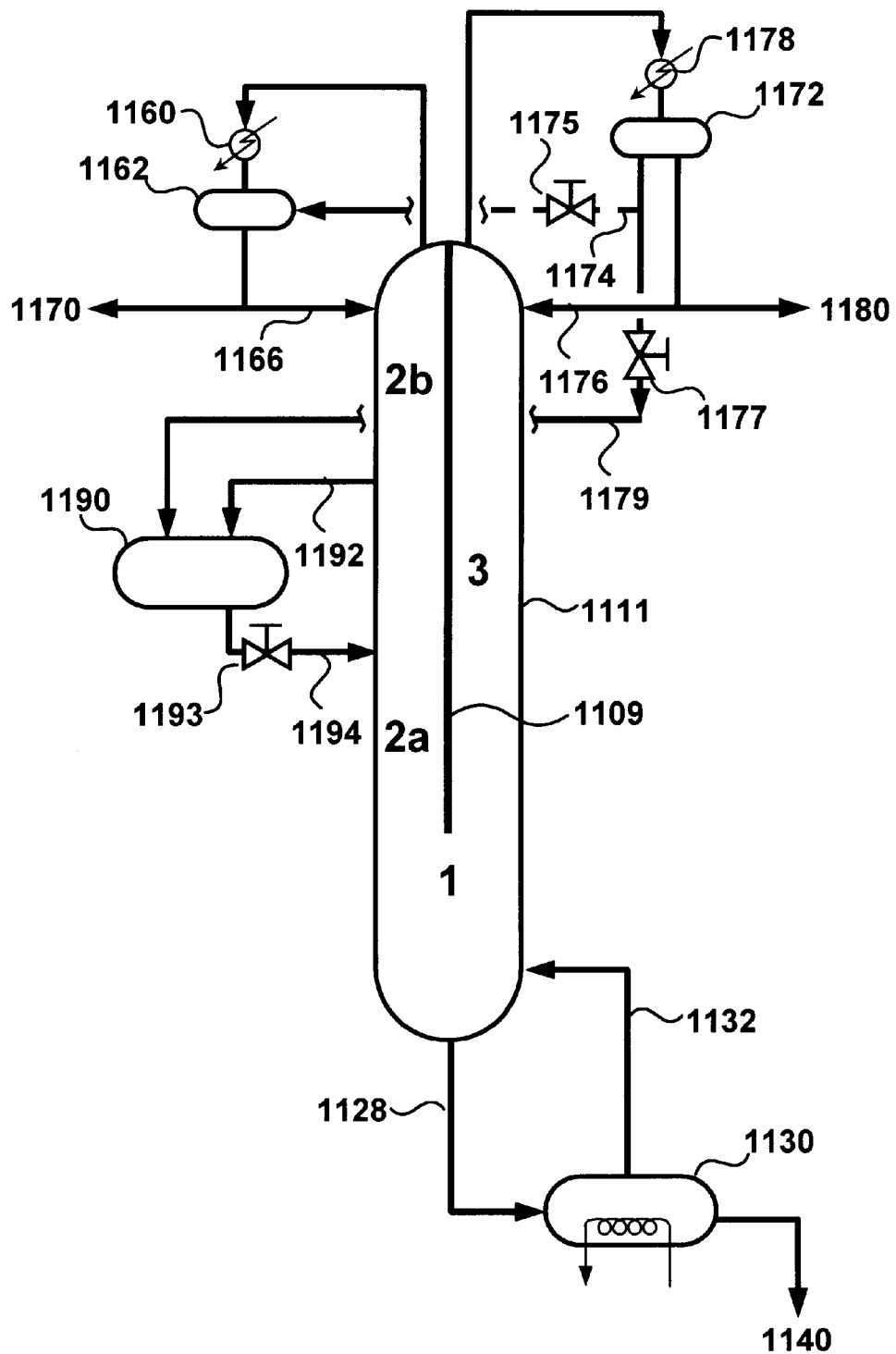
FIG. 11 is a schematic representation of a batch distillation column system having a middle vessel and a divided wall side rectifier design in accordance with the present invention.

When the middle vessel concept is applied to the divided wall side rectifier batch distillation (FIG. 6), one resulting configuration is shown in FIG. 11. The middle vessel 1190 is connected with the main column 1111 through lines 1192 and 1194 and divides the distillation zone 2 in FIG. 6 to distillation zones 2a and 2b. Now the liquid ternary mixture ABC will be initially charged to the middle vessel. The liquid initially collected in the reflux drum 1172 will be contaminated with the volatile component A and may require purge. In this case, the purged liquid can be sent through valve 1177 and line 1179 to the middle vessel 1190. This is continued until the desired purity of B is achieved in reflux drum 1172. The distillation can be performed without any purge through line 1174. As the distillation progresses, it is possible to recover product streams simultaneously from lines 1140, 1170 and 1180. Under certain operating modes, at the end of the run, middle vessel 1190 may contain B-rich liquid and could be one of the product streams.

Use of batch distillation for extractive distillation has also been suggested in the literature. Use of a middle vessel column to distill acetone/methanol mixture with water as a heavy extractive solvent was mentioned earlier. The current invention can easily be applied to such applications. Any suitable distillation column system from an array of choices available in FIGS. 2–11 can be chosen for this purpose. It is worth mentioning that in such applications, the charge to the distillation column system may itself be a binary mixture. The extractive solvent provides the third component. Therefore, the system behaves as if a ternary mixture is charged to the distillation column system because all three components need to be separated through distillation.

Figure 12:
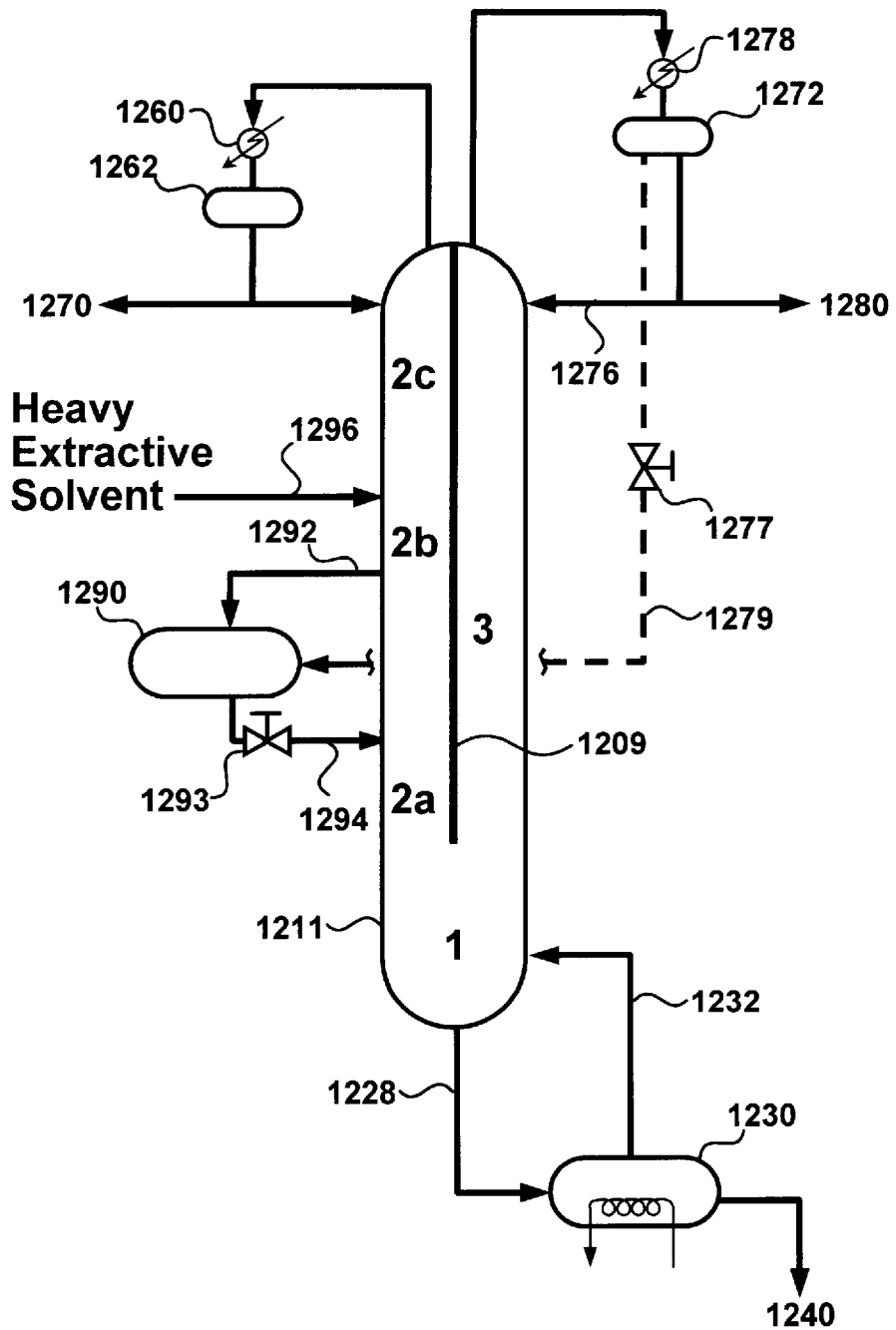
FIG. 12 is a schematic representation of a batch distillation column system for use in an extractive distillation process having a middle vessel and a divided wall side rectifier design in accordance with the present invention.

An example of the extractive distillation is shown in FIG. 12. In this case, the middle vessel side rectifier batch distillation system of FIG. 11 is used for extractive distillation. A mixture with the low boiling azeotrope is charged to the middle vessel. As the distillation proceeds, the azeotrope is broken by feeding a heavy extractive solvent through line 1296 at an intermediate location in distillation zone 2 of the distillation column 1211. This divides the distillation zone 2b (of FIG. 11) into distillation zones 2b and 2c. The heavy extractive solvent breaks the low boiling azeotrope and is recovered through line 1240. The volatile component in the feed is recovered through line 1270 and the component of lower volatility is recovered through line 1280. For example, consider the distillation of acetone/methanol mixture using water as a heavy extractive solvent. In this mixture acetone is the volatile component and methanol is of lower volatility. The mixture is charged to the middle vessel 1290 and water is introduced in line 1296. As the distillation proceeds, water extracts the methanol from acetone and it travels down the distillation zones 2b and 2a. Acetone is recovered through line 1270. Since methanol is more volatile than water, it is recovered through line 1280. Water being the heaviest component, it is recovered through line 1240. This water could then be recycled to line 1296. The current apparatus not only allows the recovery of acetone but also simultaneous recovery of methanol and water.

The present invention is described in context to a ternary mixture. However, it is clear that the invention is also applicable to the mixtures containing more than three components. In such cases, the components of intermediate volatility may be collected in steps. The most volatile amongst these would be collected first and then the next and so on. For example, consider a multi-component mixture ABCD with volatility decreasing from A to D. First A and B are collected and then C is distill ed from D. If a middle vessel distillation column system is used then A,B and D may b e simultaneously collected with C collecting in the middle vessel. Alternatively, A,C and D may be simultaneously collected with B collecting in the middle vessel. In other words, there are many alternate sequences which may be used to distill a multi-component mixture. A particular choice will depend on the task at hand.

The present invention is applicable to the separation by distillation of any suitable mixture containing three or more components. This also includes extractive distillation. In case of extractive distillation, when an extractive solvent is used, the mixture may also be binary. The multi-component mixtures include pharmaceutical chemicals, fine chemicals, specialty chemicals and industrial chemicals. Some examples of feed streams for which the present invention is applicable include nitrogen/oxygen/argon mixtures, benzene/toluene/xylene mixtures, nitrogen/carbon monoxide//methane mixtures, any combination of three or more components from C1 to C5 alcohols, any combination of three or more components from C1 to C6 hydrocarbons, or $C_4$ isomers. Some examples of hydrocarbon mixtures are: pentane-hexane-heptane; isopentane-pentane-hexane; butane-isopentane-pentane; and isobutene-n-butane-gasoline.

It was discussed earlier that Phimister and Sieder have described semicontinuous distillation using a middle vessel column arrangement. The process of current invention is also applicable to semicontinuous distillation. In this mode, the feed mixture is periodically charged to the distillation column system. Some of the distillate cuts are collected in tanks and recycled. The recycle may be to the middle vessel or to a suitable reboiler or an reflux drum. The recycle may be done at any suitable point in the distillation sequence.

The current invention is described with a number of reboilers and condensers in the distillation column system. It is possible to replace any one of such device with an external source of heat addition or heat removal. The external source may also be used in addition to any reboiler or condenser. An example of an external heat removal may be whereby in FIG. 2 at least a portion of the vapor stream from the top of the main distillation column 210 is sent to a chemical process where it exchanges heat with a suitable medium and is then returned to the reflux drum. Alternatively, the vapor stream may be a product stream and a suitable liquid stream from an external source is sent as reflux through line 266. Analogous actions could be taken with the vapor boilup.

When a ternary mixture is distilled in a conventional batch distillation column, it is first charged in the reboiler (FIG. 1). As the distillation proceeds, the most volatile component A is collected first from the reflux drum at the top. This is followed by a slop cut containing both A and B. Then the component of intermediate volatility B is collected. Finally, heavy component C is left in the reboiler. In other words, components A and B are collected in a sequential manner. The process of the current invention such as the one in FIG. 2 facilitates the distillation by collecting component of intermediate volatility B while A is being collected from the top of the main distillation column 210. Since B is not collected sequentially after A, the distillation batch time is reduced. This can potentially lead to lower energy demand and more production due to increased number of batches that can be run in a given time period. Furthermore, in conventional batch distillation as component A is removed from the distillation column system, the concentration of component B builds up. This means higher reflux ratio with time. This increases the energy requirement. However, in the process of current invention, since B is also removed simultaneously with A, the concentration of B in the main column does not build up and the reflux ratios can be much lower. This can potentially lead to lower energy consumption even when the distillation is in progress. Finally the process of current invention is quite flexible. It provides many alternatives to run a batch distillation campaign efficiently and economically.

On the other hand, continuous feed distillation processes with constant feed rates and using thermally coupled columns are quite energy efficient. However, with the known operating modes, they are not flexible. They run at a steady state with concentration profiles in the column remaining unchanged with time. They are designed to distill a particular feed mixture. They are used for large volume feeds. The current invention makes it possible to use thermally coupled columns in batch mode. One can distill smaller quantities of multi-component mixtures. The new systems are quite flexible and the same apparatus can be used to distill a number of different multi-component mixtures.

Although illustrated and described herein with reference to certain specific embodiments, the present invention is nevertheless not limited to the details shown. Rather, various modifications may be made to the details within the scope and range of equivalents of the claims and without departing from the spirit of the invention.

What is claimed is:

1. A process for the separation of a multi-component mixture containing at least three major constituent components of different relative volatilities into product streams that are enriched in one of the major constituent components by distillation in a distillation column system comprising:
   (a) initially charging the multi-component mixture containing at least three major components to at least one suitable location in the distillation column system having at least three distillation zones, wherein one of the distillation zones is in fluid communication with the vapor and liquid flows of the at least two other distillation zones;

(b) distilling the multi-component mixture within the at least three distillation zones such that distillation is conducted for at least a period of time without any addition of the multi-component mixture to the distillation column system;

(c) collecting a light product stream enriched in the light component from the top of one distillation zone;

(d) collecting a heavy product stream enriched in the heavy component from the bottom of a different distillation zone from step (c); and (e) collecting an intermediate volatility stream enriched in the medium component from a third distillation zone which is different from the distillation zones of steps (c) and (d).

2. The process of claim 1 further comprising the step of providing vapor at the bottom of a distillation zone and liquid to the top of a distillation zone during step (b).

3. The process of claim 2 wherein vapor is provided at the bottom by reboiling a liquid stream exiting the bottom of the distillation column.

4. The process of claim 2 wherein the liquid is provided by condensing a vapor stream exiting the top of the distillation column.

5. A process for the separation of a multi-component mixture containing at least three major constituent components of different relative volatilities into product streams that are enriched in one of the major constituent components by distillation in a distillation column system comprising:

(a) charging the multi-component mixture containing at least three major components to a distillation column;

(b) distilling the multi-component mixture within at least two distillation zones within the distillation column without any further charging of the multi-component mixture to the distillation column system;

(c) providing a first portion of the distilled stream from the location where the two distillation zones of step (b) meet to a third distillation zone;

(d) collecting a light product stream enriched in the light component from the top of the distillation column;

(e) collecting an intermediate volatility stream enriched in the medium component from the third distillation zone; and (f) collecting a heavy product stream enriched in the heavy component from the bottom of the distillation column.

6. The process of claim 5 further comprising the step of providing vapor at the bottom of the distillation column and liquid to the top of the distillation column during step (b).

7. The process of claim 5 wherein vapor is provided at the bottom by reboiling a liquid stream exiting the bottom of the distillation column.

8. The process of claim 5 wherein the liquid is provided by condensing a vapor stream exiting the top of the distillation column.

9. A process for the separation of a multi-component mixture containing at least three major constituent components of different relative volatilities into product streams that are enriched in one of the major constituent components by distillation in a distillation column system comprising:

(a) charging the multi-component mixture containing three or more major constituent components to a first distillation column;

(b) establishing a two-way communication between an intermediate section of the first distillation column and a first location of a second distillation column by feeding at least a portion of the vapor or liquid stream exiting from the intermediate section of the first distillation column to the first location of the second distillation column and in return withdrawing a stream of the opposite phase from the first location of the second distillation column and feeding it to the intermediate section of the first distillation column; and (c) removing a first stream from the second distillation column, recycling a first part of the first stream back to the first distillation column and removing a second part of the first stream as a product stream from the distillation column system.

10. A batch distillation column system for distillation of a multi-component mixture containing at least three major constituent components of different relative volatilities into product streams that are enriched in one of the major constituent components comprising:

a first distillation column having a top and a bottom and at least two distillation zones disposed therein;

a second distillation column having a top and bottom, the top of the second distillation column in two-way communication with the first distillation column at a point between the two distillation zones of the first distillation column;

a reflux drum which receives condensed vapor from the top of the first distillation column;

a first reboiler at the bottom of the first distillation column; and a second reboiler at the bottom of the second distillation column.

11. The system of claim 10 wherein the bottom of the second distillation column is fluidly connected to the first reboiler.

12. A process for the separation of a multi-component mixture containing at least three major constituent components of different relative volatilities into product streams that are enriched in one of the major constituent components by distillation in a distillation column system containing at least two distillation columns comprising:

(a) charging at least a portion of the multi-component mixture containing three or more major constituent components to the bottom of a first distillation column;

(b) causing distillation to occur within the first distillation column until a majority of the heavy component is below an intermediate section of the first distillation column;

(c) establishing two-way communication between the intermediate section of the first distillation column and the top of a second distillation column by feeding at least a portion of the liquid stream exiting from the intermediate section of the first distillation column to the top of the second distillation column and in return withdrawing a stream of vapor from the top of the second distillation column and passing the withdrawn stream back to the intermediate section of the first distillation column;

(d) condensing a vapor stream from the top of the first distillation column and collecting the resultant liquid in a reflux drum;

(e) returning at least part of the liquid collected in the reflux drum in step (d) to the top of the first distillation column;

(f) removing a first product stream from the reflux drum after an acceptable concentration of the most volatile component is reached in the reflux drum;

(g) removing a second product stream from the bottom of the second distillation column after an acceptable concentration of the intermediate volatile component is reached; and (h) removing a third product stream from the bottom of the first distillation column after an acceptable concentration of the heaviest volatile component is reached.

13. The process of claim 12 further comprising the step of passing an initial portion of the liquid from the bottom of the second distillation column to the bottom of the first distillation column.

14. The process of claim 13 further comprising the step of heating a portion of the liquid from the bottom of the second distillation column in a reboiler which is at the bottom of the first distillation column.

15. The process of claim 14 wherein the liquid from the bottom of the second distillation column is passed through a reboiler at the bottom of the second distillation column before it is heated in the reboiler at the bottom of the first distillation column.

16. The process of claim 12 wherein steps (a) and (b) comprise the steps of:

charging a reboiler at the bottom of the first distillation column with the multi-component mixture;

starting a heat supply to the reboiler;

passing a vapor stream from the reboiler to the first distillation column; and condensing the vapor stream at the top of the first distillation column and allowing the condensate to descend the first distillation column.

17. A batch distillation column system for distillation of a multi-component mixture containing at least three major constituent components of different relative volatilities into product streams that are enriched in one of the major constituent components comprising:

a distillation column having a top and a bottom and at least three distillation zones disposed therein, the distillation column having an upper and lower region, the lower region having a vertical separating element which defines the first and third distillation zones, the upper region defining the second distillation zone;

a reflux drum at the top of the distillation column;

a first reboiler at the bottom of the first distillation zone; and a second reboiler at the bottom of the third distillation zone, the second reboiler also in fluid communication through a valve with the first reboiler.

18. The system of claim 17 wherein the vertical separating element is a cylinder concentrically disposed within the distillation column lower region whereby the inner cylindrical region defined by the cylinder is the first distillation zone and the annular space between the cylinder and the distillation column defines the third distillation zone.

19. A batch distillation column system for distillation of a multi-component mixture containing at least three major constituent components of different relative volatilities into product streams that are enriched in one of the major constituent components comprising:

a first distillation column having a top and a bottom and at least two distillation zones disposed therein;

a second distillation column having a top and bottom, the bottom of the second distillation column in two-way communication with the first distillation column at a point between the two distillation zones of the first distillation column;

a reflux drum in fluid communication with the first distillation column;

a first reboiler in fluid communication with the first distillation column; and a second reflux drum in fluid communication with the second distillation column.

20. A process for the separation of a multi-component mixture containing at least three major constituent components of different relative volatilities into product streams that are enriched in one of the major constituent components by distillation in a distillation column system containing at least two distillation columns comprising:

(a) charging at least a portion of the multi-component mixture containing three or more major constituent components to the first reflux drum located at the top of the first distillation column;

(b) causing distillation to occur within the first distillation column until a majority of the light component is above an intermediate section of the first distillation column;

(c) establishing a two-way communication between an intermediate section of the first distillation column and the bottom of a second distillation column by feeding at least a portion of the vapor stream exiting from the intermediate section of the first distillation column to the bottom of the second distillation column and in return withdrawing a stream of liquid from the bottom of the second distillation column and passing the withdrawn stream back to the intermediate section of the first distillation column;

(d) condensing a vapor stream from the top of the second distillation column and collecting the resultant liquid in a second reflux drum;

(e) returning at least portion of the liquid collected in the second reflux drum in step (d) to the top of the second distillation column;

(f) removing a first product stream from the second reflux drum after an acceptable concentration of the intermediate volatile component is reached in the second reflux drum;

(g) removing a second product stream from the bottom of the first reflux drum at the distillation column after an acceptable concentration of the heaviest component is reached; and (h) removing a third product stream from the first reflux drum at the top of the first distillation column after an acceptable concentration of the lightest volatile component is reached.

21. The process of claim 20 further comprising the step of condensing a stream from the top of the first distillation column, collecting the resultant liquid in a first reflux drum, and returning a portion of the collected liquid to the first distillation column.

22. The process of claim 20 further comprising the step of passing an initial portion of the liquid collected in the second reflux drum to the first reflux drum.

23. A distillation column system for distillation of a multi-component mixture containing at least three major constituent components of different relative volatilities into product streams that are enriched in one of the major constituent components comprising:

a distillation column having a top and a bottom and at least three distillation zones disposed therein, the distillation column having an upper and lower region, the upper region having a vertical separating element which defines the second and third distillation zones, the lower region defining the first distillation zone;

a first reflux drum in communication with the second distillation zone;

a second reflux drum in communication with the third distillation zone, the second reflux drum also in fluid communication through a valve with the first reflux drum; and a reboiler in communication with the first distillation zone.

24. A distillation column system for distillation of a multi-component mixture containing at least three major constituent components of different relative volatilities into product streams that are enriched in one of the major constituent components comprising:

a first distillation column having a top and a bottom, an upper region and a lower region, and at least four distillation zones defined therein, at least two of the four distillation zones disposed in the upper region and at least two of the four distillation zones disposed in the lower region;

a second distillation column having a top and bottom and at least two distillation zones, the top of the second distillation column in two-way communication with the first distillation column at a point between the two distillation zones of the first distillation column in the upper region, and the bottom of the second distillation column in two-way communication with the first distillation column at a point between the two distillation zones of the first distillation column in the lower region;

a reflux drum in communication with the top of the first distillation column;

a reboiler in communication with the bottom of the first distillation column; and a middle vessel in communication with the first distillation column between the upper region and lower region by receiving a fluid stream from the upper region and returning a fluid stream to the lower region.

25. A process for the separation of a multi-component mixture containing at least three major constituent components of different relative volatilities into product streams that are enriched in one of the major constituent components by distillation in a distillation column system containing at least two distillation columns comprising:

(a) charging at least a portion of the multi-component mixture containing three or more major constituent components to a middle vessel in communication with a first distillation column;

(b) causing distillation to occur within the first distillation column until the concentration of the light component is below an acceptable level at a lower intermediate point in the first distillation column and until the concentration of the heavy component is below an acceptable level at an upper intermediate point in the first distillation column;

(c) establishing a two-way communication between the first distillation column at its upper intermediate point and the top of a second distillation column by feeding at least a portion of the liquid stream exiting from the upper intermediate point of the first distillation column to the top of the second distillation column and in return withdrawing a stream of vapor from the top of the second distillation column and passing the withdrawn vapor stream back to the upper intermediate point of the first distillation column;

(c) establishing a two-way communication between the first distillation column at its lower intermediate point and the bottom of the second distillation column by feeding at least a portion of the vapor stream exiting from the lower intermediate point of the first distillation column to the bottom of the second distillation column and in return withdrawing a stream of liquid from the bottom of the second distillation column and passing the withdrawn liquid stream back to the lower intermediate point of the first distillation column;

(d) removing a first product stream from the top of the first distillation column;

(e) removing a second product stream from a central region of the second distillation column; and (f) removing a third product stream from the bottom of the first distillation column.

26. The process of claim 25 wherein the first product stream removed in step (d) is enriched in the most volatile component of the multi-component mixture and is condensed and partially recycled back to the first distillation column.

27. The process of claim 25 wherein the second product stream removed in step (e) is enriched in the intermediate component of the multi-component mixture.

28. The process of claim 25 wherein the third product stream removed in step (f) is enriched in the heaviest component of the multi-component mixture and is heated and partially returned to the bottom of the first distillation column.

29. A process for the separation of a multi-component mixture containing at least three major constituent components of different relative volatilities into product streams that are enriched in one of the major constituent components by distillation in a distillation column system comprising:

(a) providing a first distillation column with an upper, upper intermediate, lower intermediate, and lower region;

(b) providing a second distillation column with an upper and lower region, the upper region in two-way communication with the first distillation column between the upper and upper intermediate regions of the first distillation column, and the lower region of the second distillation column in two-way communication with the first distillation column between the lower and lower intermediate regions of the first distillation column;

(c) charging the multi-component mixture containing three or more major constituent components to the first distillation column;

(d) preventing the two-way communications of fluid between the first distillation column and the second distillation column until a desired light component concentration between the lower and lower intermediate regions of the first distillation column and heavy component concentration between the upper and upper intermediate region of the first distillation column is established;

(e) allowing two way communication between the first and second distillation columns as defined in step (b);

(f) collecting the intermediate weight component from the second distillation column between its upper and lower regions.

30. A distillation column system for distillation of a multi-component mixture containing at least three major constituent components of different relative volatilities into product streams that are enriched in one of the major constituent components comprising:

a distillation column having a top and a bottom, an upper region and a lower region, an upper intermediate region and a lower intermediate region, and at least six distillation zones disposed therein;

the intermediate upper region and the lower intermediate region separated by a vertical separating element which defines the fourth and fifth distillation zones in the upper intermediate region and the second and third distillation zones in the lower intermediate region such that the fourth distillation zone is located above the second distillation zone;

the upper region defining the sixth distillation zone;

the lower region defining the first distillation zone;

a middle vessel in fluid communication with the distillation column between the upper intermediate region and the lower intermediate region;

a reflux drum in fluid communication with the top of the distillation column from which the light component product stream exits the system; and a reboiler in fluid communication with the bottom of the distillation column from which the heavy component product stream exits the system.

31. A process for the separation of a multi-component mixture containing at least three major constituent components of different relative volatilities into product streams that are enriched in one of the major constituent components by distillation in a distillation column system comprising:

(a) providing a distillation column with an upper, intermediate, and lower region, the intermediate region having an upper intermediate region and a lower intermediate region, and a vertical separating element which defines at least four distillation zones within the intermediate region, the lower region defining a first distillation zone, the lower intermediate region defining second and third distillation zones, the upper intermediate region defining fourth and fifth distillation zones, and the upper region defining a sixth distillation zone, wherein the fourth distillation zone is located above the second distillation zone;

(b) providing a middle vessel which is in fluid communication with the liquid descending from the fourth distillation zone and means to return the fluid from the middle vessel to the distillation column just above the second distillation zone;

(c) charging at least a portion of the multi-component mixture containing three or more major constituent components to the middle vessel;

(d) establishing a fluid communication between the first distillation zone and the second and third distillation zones, a fluid communication between the second and fourth distillation zones, a fluid communication between the sixth distillation zone and the fourth and fifth distillation zones, and a fluid communication between the fifth and third distillation zones;

(e) removing a first product stream from the top of the first distillation column;

(f) removing a second product stream from a point in the distillation column between the fifth and third distillation zones; and (g) removing a third product stream from the bottom of the first distillation column.

32. A distillation column system for distillation of a multi-component mixture containing at least three major constituent components of different relative volatilities into product streams that are enriched in one of the major constituent components comprising:

a distillation column having a top and a bottom, an upper region and a lower region, an upper intermediate region and a lower intermediate region, and at least six distillation zones disposed therein;

the intermediate upper region and the lower intermediate region separated by a vertical separating element which defines the fourth and fifth distillation zones in the upper intermediate region and the second and third distillation zones in the lower intermediate region such that the fourth distillation zone is located above the second distillation zone;

the upper region defining the sixth distillation zone;

the lower region defining the first distillation zone;

a first middle vessel in communication with the distillation column between the second and fourth distillation zones by taking fluid from the fourth distillation zone and returning fluid to the second distillation zone;

a second middle vessel in communication with the distillation column between the third and fifth distillation zones by taking fluid from the fifth distillation zone and returning fluid to the third distillation zone;

a reflux drum in fluid communication with the top of the distillation column; and a reboiler in fluid communication with the bottom of the distillation column.

33. A process for the separation of a multi-component mixture containing at least three major constituent components of different relative volatilities into product streams that are enriched in one of the major constituent components by distillation in a distillation column system comprising:

(a) providing a distillation column with an upper, intermediate, and lower region, the intermediate region having an upper intermediate region and a lower intermediate region, and a vertical separating element which defines at least four distillation zones within the intermediate region, the lower region defining a first distillation zone, the lower intermediate region defining second and third distillation zones, the upper intermediate region defining fourth and fifth distillation zones, and the upper region defining a sixth distillation zone, and wherein the fourth distillation zone is located above the second distillation zone;

(b) providing a first middle vessel which is in fluid communication with the liquid descending from the first middle vessel and means to return the fluid from the first middle vessel to the distillation column just above the second distillation zone;

(c) providing a second middle vessel which is in fluid communication with the liquid descending from the fifth distillation zone and means to return the fluid from the second middle vessel to the distillation column just above the third distillation zone;

(d) charging at least a portion of the multi-component mixture containing three or more major constituent components to the first middle vessel;

(h) establishing a fluid communication between the first distillation zone and the second and third distillation zones, a fluid communication between the second and fourth distillation zones, a fluid communication between the sixth distillation zone and the fourth and fifth distillation zones, and a fluid communication between the fifth and third distillation zones;

(f) removing a first product stream from the top of the first distillation column;

(g) removing a second product stream from a point in the distillation column between the fifth and third distillation zones; and (h) removing a third product stream from the bottom of the first distillation column.

34. A process for the separation of a multi-component mixture containing at least three major constituent components of different relative volatilities into product streams that are enriched in one of the major constituent components by distillation in a distillation column system comprising:
(a) providing a distillation column system having a top and a bottom and at least four distillation zones disposed therein, the distillation column having an upper and lower region,
the lower region having a vertical separating element which defines the first and third distillation zones,
the upper region defining the second distillation zone; and
the first distillation zone being divided in to an upper first distillation zone and a lower first distillation zone;
a reflux drum in fluid communication with the top of the distillation column;
a first reboiler in fluid communication with the bottom of the lower first distillation zone;
a second reboiler in fluid communication with the bottom of the third distillation zone; and
a middle vessel in fluid communication with the distillation column at a point between the upper first distillation zone and lower first distillation zone;
(b) charging at least a portion of the multi-component mixture containing three or more major constituent components to the middle vessel;
(c) establishing fluid communication between the lower first distillation zone and upper first distillation zone, fluid communication between the upper first distillation zone and the second distillation zone, and fluid communication between the second and third distillation zones;
(d) removing a first product stream from the third distillation zone, the first product stream enriched in the middle volatile component;
(e) removing a second product stream from the bottom of the lower first distillation zone, the second product stream enriched in the heavy volatile component;
(f) removing a third product stream from the second distillation zone, the third product stream enriched in the light volatile component; and
(g) providing means for selectively transporting a stream from the middle vessel to the distillation column.

35. A process for the separation of a multi-component mixture containing at least three major constituent components of different relative volatilities into product streams that are enriched in one of the major constituent components by distillation in a distillation column system comprising:
(a) providing a distillation column system having a top and a bottom and at least four distillation zones disposed therein, the distillation column having an upper and lower region,
the lower region having a vertical separating element which defines the first and third distillation zones,
the upper region defining the second distillation zone; and
the first distillation zone being divided in to an upper first distillation zone and a lower first distillation zone;
a reflux drum in fluid communication with the top of the distillation column;
a first reboiler in fluid communication with the bottom of the lower first distillation zone;
a second reboiler in fluid communication with the bottom of the third distillation zone; and
a middle vessel in fluid communication with the distillation column at a point between the upper first distillation zone and lower first distillation zone;
(b) charging at least a portion of the multi-component mixture containing three or more major constituent components to the middle vessel;
(c) establishing fluid communication between the lower first distillation zone and upper first distillation zone, fluid communication between the upper first distillation zone and the second distillation zone, and fluid communication between the second and third distillation zones;
(d) removing a first product stream from the third distillation zone, the first product stream enriched in the middle volatile component;
(e) removing a second product stream from the bottom of the lower first distillation zone, the second product stream enriched in the heavy volatile component;
(f) removing a third product stream from the second distillation zone, the third product stream enriched in the light volatile component;
(g) providing means for selectively transporting an initial portion of the stream enriched in the middle volatile component but containing heavy component from the second reboiler to the middle vessel; and
(h) providing means for selectively transporting a stream from the middle vessel to the distillation column.

36. The process of claim 34 wherein the second reboiler is initially in fluid communication with the first reboiler, and a portion of the first product stream is initially purged from the second reboiler to the first reboiler.

37. A distillation column system for distillation of a multi-component mixture containing at least three major constituent components of different relative volatilities into product streams that are enriched in one of the major constituent components comprising:
a distillation column having a top and a bottom and at least four distillation zones disposed therein, the distillation column having an upper and lower region,
the lower region having a vertical separating element which defines the first and third distillation zones, the first distillation zone being divided into an upper first distillation zone and a lower first distillation zone; and
the upper region defining the second distillation zone;
a reflux drum in fluid communication with the top of the distillation column;
a first reboiler in fluid communication with the bottom of the lower first distillation zone;
a second reboiler in fluid communication with the third distillation zone; and
a middle vessel in fluid communication with the distillation column at a point between the upper first distillation zone and lower first distillation zone.

38. The system of claim 37 further comprising means for fluid communication between the first and second reboilers.

39. The system of claim 37 further comprising means for fluid communication between the second reboiler and the middle vessel.

40. A distillation column system for distillation of a multi-component mixture containing at least three major constituent components of different relative volatilities into product streams that are enriched in one of the major constituent components comprising:

a distillation column having a top and a bottom and at least three distillation zones disposed therein, the distillation column having an upper and lower region, the upper region having a vertical separating element which defines the second and third distillation zones, the second distillation zone being divided into an upper second distillation zone and a lower second distillation zone; and the lower region defining the first distillation zone;

a middle vessel in communication with the distillation column at a point between the upper second distillation zone and the lower second distillation zone such that it receives a fluid stream from the upper second distillation zone and sends a fluid stream to the lower second distillation zone;

a first reflux drum in communication with the top of the distillation column above the second distillation zone;

a second reflux drum in communication with the top of the distillation column above the third distillation zone; and a reboiler in communication with the bottom of the distillation column.

41. A process for the separation of a multi-component mixture containing at least three major constituent components of different relative volatilities into product streams that are enriched in one of the major constituent components by distillation in a distillation column system comprising:

(a) providing a distillation column system having a distillation column with a top and a bottom and at least three distillation zones disposed therein, the distillation column having an upper and lower region, the upper region having a vertical separating element which defines the second and third distillation zones, the second distillation zone being divided into an upper second distillation zone and a lower second distillation zone; and the lower region defining the first distillation zone;

a middle vessel in communication with the distillation column at a point between the upper second distillation zone and the lower second distillation zone such that it receives a fluid stream from the upper second distillation zone and sends a fluid stream to the lower second distillation zone;

a first reflux drum in communication with the top of the distillation column above the second distillation zone;

a second reflux drum in communication with the top of the distillation column above the third distillation zone; and a reboiler in communication with the bottom of the distillation column;

(b) charging at least a portion of the multi-component mixture containing three or more major constituent components to the middle vessel;

(c) collecting a condensed stream in the second reflux drum and purging at least an initial portion of the condensed stream to the middle vessel;

(d) continuing step (c) until at least a minimum level of purity of the intermediate component is collected in the second reflux drum;

(e) removing a first product stream from the third distillation zone;

(f) removing a second product stream from the first distillation zone; and (g) removing a third product stream from the second distillation zone.

42. A process for the separation of a mixture containing at least two major constituent components of different relative volatilities into product streams that are enriched in one of the major constituent components by distillation in a distillation column system comprising:

(a) providing a distillation column system having a distillation column with a top and a bottom and at least four distillation zones disposed therein, the distillation column having an upper and lower region, the upper region having a vertical separating element which defines the second and third distillation zones, the second distillation zone being divided into an upper second distillation zone, an intermediate second distillation zone, and a lower second distillation zone; and the lower region defining the first distillation zone;

a middle vessel in communication with the distillation column at a point between the intermediate second distillation zone and the lower second distillation zone;

a first reflux drum in communication with the top of the distillation column above the second distillation zone;

a second reflux drum in communication with the top of the distillation column above the third distillation zone and in fluid communication with the middle vessel; and a reboiler in communication with the bottom of the distillation column;

(b) charging the mixture containing two or more major constituent components to the distillation column from the middle vessel;

(c) feeding a solvent stream into the distillation column;

(d) collecting a condensed stream in the second reflux drum and purging at least an initial portion of the condensed stream to the middle vessel;

(e) continuing steps (c) and (d) until at least a minimum level of purity of the intermediate component is collected in the second reflux drum;

(f) removing a first product stream from the third distillation zone;

(g) recovering the solvent introduced in step (c) from the first distillation zone; and (h) removing a second product stream from the second distillation zone.

* * * * *